(12) United States Patent
Chraibi et al.

(10) Patent No.: US 10,588,198 B2
(45) Date of Patent: Mar. 10, 2020

(54) LIGHTING SYSTEM

(71) Applicant: SIGNIFY HOLDING B.V., Eindhoven (NL)

(72) Inventors: Sanae Chraibi, Eindhoven (NL); Tatiana Aleksandrovna Lashina, Eindhoven (NL); Marija Despenic, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 20 days.

(21) Appl. No.: 16/082,956

(22) PCT Filed: Mar. 6, 2017

(86) PCT No.: PCT/EP2017/055131
§ 371 (c)(1),
(2) Date: Sep. 7, 2018

(87) PCT Pub. No.: WO2017/153308
PCT Pub. Date: Sep. 14, 2017

(65) Prior Publication Data
US 2019/0090329 A1      Mar. 21, 2019

(30) Foreign Application Priority Data
Mar. 7, 2016   (EP) .................................... 16158862

(51) Int. Cl.
*H05B 37/02*  (2006.01)
(52) U.S. Cl.
CPC ..... *H05B 37/0245* (2013.01); *H05B 37/0227* (2013.01)

(58) Field of Classification Search
CPC ............ H05B 37/0227; H05B 37/0245; H05B 37/0254; H05B 37/0272; H05B 37/0281
(Continued)

(56) References Cited

U.S. PATENT DOCUMENTS

| 6,185,534 B1 | 2/2001 | Breese et al. |
| 6,724,159 B2 | 4/2004 | Gutta et al. |

(Continued)

FOREIGN PATENT DOCUMENTS

WO     2010079388 A1    7/2010

*Primary Examiner* — Tung X Le
(74) *Attorney, Agent, or Firm* — Stephen M. Kohen

(57) ABSTRACT

A lighting system comprises at least one luminaire arranged to illuminate an area shared by a plurality of users. From at least one of the users, at least one level adjustment instruction is received, denoting an illumination level instructed by that user for the shared area. When operating in a manual control mode for the shared area, the at least one luminaire is controlled to emit illumination at the illumination level denoted by the most recently received of the level adjustment instruction(s). A plurality of user profiles is generated, each of a respective one of the users and comprising preference information, wherein the preference information for the at least one user is derived from his at least one level adjustment instruction. A consensus illumination level for the shared area is determined, by combining the preference information of at least two of the user profiles stored in the memory. In an automatic control mode, the at least one luminaire emits illumination at the determined consensus illumination level.

20 Claims, 15 Drawing Sheets

(58) Field of Classification Search
USPC ........................................ 315/149, 307, 312
See application file for complete search history.

(56) References Cited

U.S. PATENT DOCUMENTS

| | | | | |
|---|---|---|---|---|
| 8,723,450 | B2* | 5/2014 | Hatley | H05B 33/086 |
| | | | | 315/312 |
| 8,731,689 | B2* | 5/2014 | Platner | H05B 37/0245 |
| | | | | 700/22 |
| 9,066,404 | B2 | 6/2015 | Paolini et al. | |
| 10,088,818 | B1* | 10/2018 | Mathews | H04L 12/2825 |
| 2003/0227439 | A1 | 12/2003 | Lee et al. | |
| 2005/0218838 | A1* | 10/2005 | Lys | H02M 1/4225 |
| | | | | 315/291 |
| 2008/0197790 | A1* | 8/2008 | Mangiaracina | F21S 9/022 |
| | | | | 315/312 |
| 2009/0278479 | A1* | 11/2009 | Platner | H05B 37/0245 |
| | | | | 315/312 |
| 2012/0116544 | A1 | 5/2012 | Shrubsole | |
| 2012/0169249 | A1 | 7/2012 | Loveland et al. | |
| 2012/0331137 | A1 | 12/2012 | Olsen et al. | |
| 2013/0154486 | A1* | 6/2013 | Barrilleaux | H05B 37/0245 |
| | | | | 315/158 |
| 2014/0222215 | A1 | 8/2014 | Nishiyama et al. | |
| 2014/0280576 | A1 | 9/2014 | Cowan | |
| 2014/0303788 | A1* | 10/2014 | Sanders | E06B 9/32 |
| | | | | 700/276 |
| 2015/0296599 | A1* | 10/2015 | Recker | H05B 37/0272 |
| | | | | 315/153 |
| 2016/0037613 | A1 | 2/2016 | Laherty et al. | |
| 2017/0245354 | A1* | 8/2017 | Yadav | H05B 37/0281 |

\* cited by examiner

| User ID 401 | Active/inactive 402 | Dominant/ submissive 403 | Satisfied/ unsatisfied 404 | Preference data 405 |

LIGHTING SYSTEM

CROSS-REFERENCE TO PRIOR APPLICATIONS

This application is the U.S. National Phase application under 35 U.S.C. § 371 of International Application No. PCT/EP2017/055131, filed on Mar. 6, 2017, which claims the benefit of European Patent Application No. 16158862.9, filed on Mar. 7, 2016. These applications are hereby incorporated by reference herein.

TECHNICAL FIELD

The present invention relates to a lighting system comprising at least one luminaire arranged to illuminate an area shared by a plurality of users, for example in an open plan office.

BACKGROUND

From US 2016/037613 A1 a system is known which adjusts environmental conditions, such as light levels, based on an average of user preferences in a given area.

A lighting system for illuminating an environment may comprise a plurality of luminaires, each of which, in turn, comprises a light source in the form of one or more lamps that emit configurable illumination into the environment. The lamps may for example be LED lamps, filament bulbs, gas discharge lamps etc.

The luminaires may be inter-connected so as to form a lighting network. In order to control the illumination, a gateway, such as a lighting bridge, may be connected to the network. The gateway can be used to communicate control signals via the network to each of the luminaires, for example under the control of a general-purpose computer device connected to the gateway.

The lighting network may have a mesh topology, whereby the luminaires themselves act as relays within the lighting network, relaying control signals between the gateway and other luminaires in the network. Alternatively, the network may have a star topology, whereby luminaires communicate with the gateway "directly" i.e. without relying on other luminaires to relay the control signals (though possibly via other dedicated network components). Generally, the network can have any suitable network topology e.g. based on a combination of star-like and mesh-like connections. The lighting network may for example operate in accordance with ZigBee protocols.

Modern lighting systems may be controlled using a general purpose computing device which allows much more convenient control than traditional wall switches. The computing device may be a personal computing device of the user such as a smart phone or a dedicated computing device within the environment such as a desktop PC or server. Either way, a user within the environment is able to control the light output of the luminaires by using the computing device to transmit control signals to the luminaires. This also allows, say, office or shop lighting to be controlled largely automatically, for example by a server.

SUMMARY

An environment in which a lighting system is installed may contain a plurality of users such that the light settings provided by the luminaires of the lighting system may affect multiple users at once. This means that an area shared by a plurality of users (e.g. all or part of an open plan office) may be illuminated by a single luminaire or multiple luminaires that are not independently controllable, such that only a single illumination level can be set for the luminaire(s) illuminating the shared area at any one time. Even if the luminaires can be individually controlled by a given user, they might affect other users (e.g. a desk area of another user) by lighting spilling over.

Each individual user in the environment may have their own personal desired light settings, and from time to time the users' individual wishes may conflict with one another. Thus, on the other hand, the present invention recognizes that permitting each user to individually set the illumination level of the shared area, overriding any illumination level previously set by another of the users, can lead to conflicts and user dissatisfaction if the individual preferences and tolerances of two or more of the users are too diverse or too narrow respectively. On the other hand, the present invention recognizes that permitting such individual control where possible has two advantages: (i) in the case that the user's individual preferences and tolerances are reasonably aligned with one another, a better user experience is provided when each of the users is granted the opportunity to individually adjust the illumination level himself (e.g. at his desk in an open plan office) and (ii) by monitoring and analysing how users actually choose to adapt the illumination level in the shared area, their individual preferences and tolerances, of which they may not even be consciously aware, can be learnt accurately.

Accordingly a lighting system with a manual (i.e. individual) control mode and an automatic (i.e. consensus-based) control mode is provided. In the manual control mode, each user in a shared area is free to set the illumination level for the shared area individually, overriding any previously applied setting as they see fit. For those users that choose to exert this individual control in this manner, the system learns their preferences from their controlling behaviour. These preferences learned by monitoring the system in the manual mode are used to determine a consensus illumination level for the shared area to be used in an automatic control mode, and which is designed to satisfy all of the users in the shared area to the extent that this is possible given any differences in their learned preferences.

According to a first aspect, a lighting system comprises: at least one luminaire arranged to illuminate an area shared by a plurality of users; a communications interface configured to receive, from each of at least two of the users, at least one respective level adjustment instruction denoting an illumination level instructed by that user for the shared area; an illumination controller configured, when operating in a manual control mode for the shared area, to control the at least one luminaire to emit illumination at the illumination level denoted by the most recently received level adjustment instruction; a modelling module configured to generate in a memory of the lighting system a plurality of user profiles, each of a respective one of the users and comprising preference information derived from his at least one respective level adjustment instruction; and a processing module configured to determine a consensus illumination level for the shared area, by combining the preference information of at least two of the user profiles stored in the memory; wherein illumination controller is configured, in response to a mode switch instruction, to switch to an automatic control mode for the shared area, by controlling the at least one luminaire to emit illumination at the determined consensus illumination level.

In the described embodiments, each user is able to set the illumination level using their own user device (e.g. smartphone, tablet, or other computer device). That is, each of the users is equipped with a respective user device, and the at least one level adjustment instruction from each of the at least two users is generated at his respective user device.

In some circumstances all of the users in the shared area will choose to control the illumination level in the manual mode by providing at least one level adjustment illumination instruction to the system, such that the preference information for each of the users can be derived from his respective at least one level adjustment instruction. Users who choose to exert such control are referred to as dominant users. That is, a dominant user is either one that is not reluctant to control lighting in the presence of others, or one that has the preferences that dominates in a given control zone. For example, even a user providing a single control command to the system may be classified as dominant if a setting (e.g. max luminaire output) selected by that user remains in that zone for a long time.

In other circumstances, not all of the users will choose to exert this control. Preferably, users who do choose not to exert this control (submissive users) are automatically identified by the system, and feedback is requested from them to determine whether or not they are satisfied with the illumination of the shared area, and to determine their illumination level preferences if not. This is preferable as it ensures that submissive users are fairly treated. However, it is not essential—for example, default user preference information (e.g. taken from recommendations in standards or derived as the most preferred light level for similar type of users, e.g. office workers, in similar context, e.g. administrative office tasks) can be used for submissive users instead.

At least one respective level adjustment instruction may be received from each of a two or more users, who may in some cases have conflicting preferences. These conflicting preferences can be learnt from their respective level adjustment instructions. It will be appreciated that, in the following, all description pertaining to any level adjustment instruction(s) received from at least one user applies in this case to any respective level adjustment instruction(s) received from each of the at least two users.

The preference information of each of the user profiles may comprise an illumination level preferred by its respective user, which the modelling module may be configured to determine for the at least one user based on his at least one level adjustment instruction.

The processing module may be configured to determine the illumination level for the shared area by applying an averaging function to the preferred illumination levels of the at least two user profiles.

For example, the preference information of each of the user profiles may also comprise an associated tolerance value denoting a tolerance of its respective user to deviations from his preferred illumination level, which the modelling module may be configured to determine for the at least one user based on at least two level adjustment instructions received from that user—for example based on a difference between the instructed illumination levels denoted by the at least two level adjustment instructions or the deviation from the earlier instructed illumination level after which the user is triggered to set the at least second level adjustment instruction.

The processing module may be configured, in applying the averaging function, to weight the preferred illumination levels of the at least two user profiles according to their associated tolerance values.

Each of the user profiles may comprise a dominance indicator indicating whether or not its respective user is dominant.

The modelling module may be configured to generate the dominance indicator for each user profile by comparing historic illumination level data of the at least one luminaire with the preference information of that user profile.

For example, the modelling module may be configured to generate the dominance indicator for at least one of the users by determining from the historic illumination level data a duration for which the illumination level of the at least one luminaire has matched an illumination level preferred by that user.

The system may comprise a selection module configured to use the dominance indicators to select the at least two user profiles for use by the processing module in determining the illumination level for the shared area.

At least one of user profiles may comprise an activity indicator indicating whether or not its respective user is active, which the modelling module may be configured to determine for that user by determining an extent to which he has provided any level adjustment instructions in the manual mode.

The system may comprise a request module configured to identify an inactive one of the users using the activity indicator in his user profile, and request preference information from him via the communication interface.

If the inactive user responds by indicating, via the communication interface, that he is satisfied with the illumination of the shared area, the preference profile of the user will be determined based on the light level experienced by him, even though this level was instructed by one or more of the other users.

On the other hand, if the inactive user responds by indicating, via the communication interface, that he is not satisfied with the illumination of the shared area, the modelling module may be configured to update his profile with preference information derived from his response, which may be used to determine the illumination level for the shared area in that event.

The request module may be configured to identify the inactive user as both inactive and not dominant using the activity and dominance indicators in his profile.

The processing module may be configured to determine, for at least one of the users, a reduced illumination level that is lower than his preferred illumination level by an amount determined by its associated tolerance value, and to determine the illumination level for the shared area based on the reduced illumination level.

The system may comprise a request module configured to output to that user via the communications interface a level reduction request, wherein the reduced illumination level for that user is only used to determine the illumination level for the shared area if he approves the level reduction request.

The reduced illumination level is suggested as an energy saving measure; basing the reduction on the user's tolerance makes it more likely the user will accept the reduction, thereby maximizing energy savings across a population of users. Another possible benefit of suggesting a reduced illumination level is to meet the preference of an inactive submissive user in the same space.

Each of the users may be equipped with a respective user device, which is usable by that user to generate respective level adjustment instructions in the manual control mode. That is, each user may have their own user device by which they can adjust the illumination level of the shared area in the manual mode, and provide feedback when requested.

The mode switch instruction may be instigated automatically; for example: according to an electronically stored lighting schedule, and/or based on sensor signals received from at least one occupancy sensor arranged to provide sensor coverage of the shared area, and/or if no level adjustment instruction is received within a predetermined interval of time (or automatically by some other means).

Alternatively the mode switch instruction may be instigated manually by a user.

A second aspect is directed to a computer implemented method of operating lighting system comprising at least one luminaire arranged to illuminate an area shared by a plurality of users, the method comprising implementing by a computer system of the lighting system the following steps: receiving, from at least one of the users, at least one level adjustment instruction denoting an illumination level instructed by that user for the shared area; operating in a manual control mode for the shared area, by controlling the at least one luminaire to emit illumination at the illumination level denoted by the most recently received of the level adjustment instruction(s); generating in a memory of the lighting system a plurality of user profiles, each of a respective one of the users and comprising preference information, wherein the preference information for the at least one user is derived from his at least one level adjustment instruction; determining a consensus illumination level for the shared area, by combining the preference information of at least two of the user profiles stored in the memory; and in response to a mode switch instruction, switching to an automatic control mode for the shared area by controlling the at least one luminaire to emit illumination at the determined consensus illumination level.

In embodiments, the method may implement any of the system functionality disclosed herein.

According to a third aspect, a computer program product comprises code stored on a computer readable storage medium and configured when run on a computer to implement any of the methods disclosed herein.

For a lighting system, there may be provided a user device for controlling a lighting system, wherein the lighting system comprises at least one luminaire arranged to illuminate an area shared by a plurality of users including a user of the user device, the user device comprising: a display; a communications interface configured to receive first preference data denoting an illumination level preferred by another of the plurality of users individually and/or second preference data denoting an illumination level proposed for the shared area; input apparatus configured to receive from the user of the user device a level adjustment input denoting an illumination level for the at least one luminaire instructed by the user of the user device; memory holding executable code; and a processor connected to the memory, wherein the code is configured when executed on the processor to implement the following operations: transmitting to the lighting system via the communications interface a level adjustment instruction, which denotes the user's instructed illumination level, thereby causing the illumination of the at least one luminaire to be adjusted to the user's instructed illumination level, and controlling the display to display to the user of the user device an indication of: the illumination level preferred by the other user individually, based on the first preference data, and/or the proposed illumination level, based on the second preference data, whereby the user of the user device can compare that or those levels to their instructed illumination level to which they have adjusted the illumination in the shared area.

As an example, the first preference data identifies the other user, wherein the code is configured to control the display based thereon to display an identifier of the other user in association with the displayed indication of the other user's individually preferred illumination level.

As an example, the communications interface is configured to receive third preference data denoting an illumination level preferred by the user of the user device, and the code is configured to control the display to display to the user an indication of: a difference between his preferred illumination level and the other user's individually preferred illumination level, based on the first and third preference data, and/or a difference between his preferred illumination level and the proposed illumination level, based on the second and third preference data.

As an example, the code is configured to control the display to display to the user an indication of: a difference between the other user's individually preferred illumination level and their instructed illumination level to which they have adjusted the illumination in the shared area, based on the first preference data and the level adjustment input, and/or a difference between the proposed illumination level and their instructed illumination level to which they have adjusted the illumination in the shared area, based on the second preference data and the level adjustment input.

As an example, the operations further comprise: in response to a feedback request received from the lighting system via the communications interface, control the display to display to the user a feedback interface; and transmitting to the lighting system via the communications interface a response to the feedback request based on feedback inputs received from the user interface whilst the feedback interface was being displayed.

As an example, the response comprises a satisfaction indicator derived from the feedback inputs denoting whether or not the user is satisfied with the illumination of the shared area.

As an example, the satisfaction indicator is a binary value.

As an example, the response comprises a dissatisfaction value derived from the feedback inputs denoting an amount by which the user would prefer the level of the illumination of the shared area to change.

The aforementioned user device may be part of a lighting system, the lighting system comprising: at least one luminaire arranged to illuminate an area shared by a plurality of users, each equipped with a respective user device; a communications interface configured to receive from one of the user devices a level adjustment instruction, wherein the level adjustment instruction denotes an illumination level instructed by the user of that device; an illumination controller configured to control the at least one luminaire, in response to the adjustment instruction, to emit illumination at the user's instructed illumination level; memory configured to hold first preference data denoting of an illumination level preferred by another of the plurality of users individually and/or second preference data denoting an illumination level proposed for the shared area; and a preference notification module configured to transmit to the user device via the communications interface the first preference data and/or the second preference data for use by the user device in displaying an indication of the illumination level preferred by the other user individually and/or the proposed illumination level.

the aforementioned lighting system may be controlled according to a method of controlling a lighting system, wherein the lighting system comprises at least one luminaire arranged to illuminate an area shared by a plurality of users including a user of a user device, the method comprising steps of: receiving first preference data denoting an illumination level preferred by another of the plurality of users individually and/or second preference data denoting an illumination level proposed for the shared area; receiving from the user of the user device a level adjustment input denoting an illumination level for the at least one luminaire instructed by the user of the user device; transmitting to the lighting system a level adjustment instruction, which denotes the user's instructed illumination level, thereby causing the illumination of the at least one luminaire to be adjusted to the user's instructed illumination level, and displaying to the user of the user device an indication of: the illumination level preferred by the other user individually, based on the first preference data, and/or the proposed illumination level, based on the second preference data, whereby the user of the user device can compare that or those levels to their instructed illumination level to which they have adjusted the illumination in the shared area.

As an example, the first preference data identifies the other user; and the method further comprises a step of: displaying, based on the first preference data identifying the other user, an identifier of the other user in association with the displayed indication of the other user's individually preferred illumination level.

As an example, the method further comprises steps of: receiving third preference data denoting an illumination level preferred by the user of the user device; displaying to the user an indication of: a difference between his preferred illumination level and the other user's individually preferred illumination level, based on the first and third preference data, and/or a difference between his preferred illumination level and the proposed illumination level, based on the second and third preference data.

As an example, the method further comprises a step of: displaying to the user an indication of: a difference between the other user's individually preferred illumination level and their instructed illumination level to which they have adjusted the illumination in the shared area, based on the first preference data and the level adjustment input, and/or a difference between the proposed illumination level and their instructed illumination level to which they have adjusted the illumination in the shared area, based on the second preference data and the level adjustment input.

The aforementioned method may be implemented as a computer program product controlling a lighting system, wherein the lighting system comprises at least one luminaire arranged to illuminate an area shared by a plurality of users including a user of a user device, the computer program product comprising code embodied on a computer-readable medium and configured so as when executed to perform operations of: receiving first preference data denoting an illumination level preferred by another of the plurality of users individually and/or second preference data denoting an illumination level proposed for the shared area; receiving from the user of the user device a level adjustment input denoting an illumination level for the at least one luminaire instructed by the user of the user device; transmitting to the lighting system a level adjustment instruction, which denotes the user's instructed illumination level, thereby causing the illumination of the at least one luminaire to be adjusted to the user's instructed illumination level, and displaying to the user of the user device an indication of: the illumination level preferred by the other user individually, based on the first preference data, and/or the proposed illumination level, based on the second preference data, whereby the user of the user device can compare that or those levels to their instructed illumination level to which they have adjusted the illumination in the shared area.

BRIEF DESCRIPTION OF FIGURES

For a better understanding of the present invention, and to show how embodiments of the same may be carried into effect, reference is made to the following figures, in which.

DESCRIPTION OF THE PREFERRED EMBODIMENTS

Figure 1:
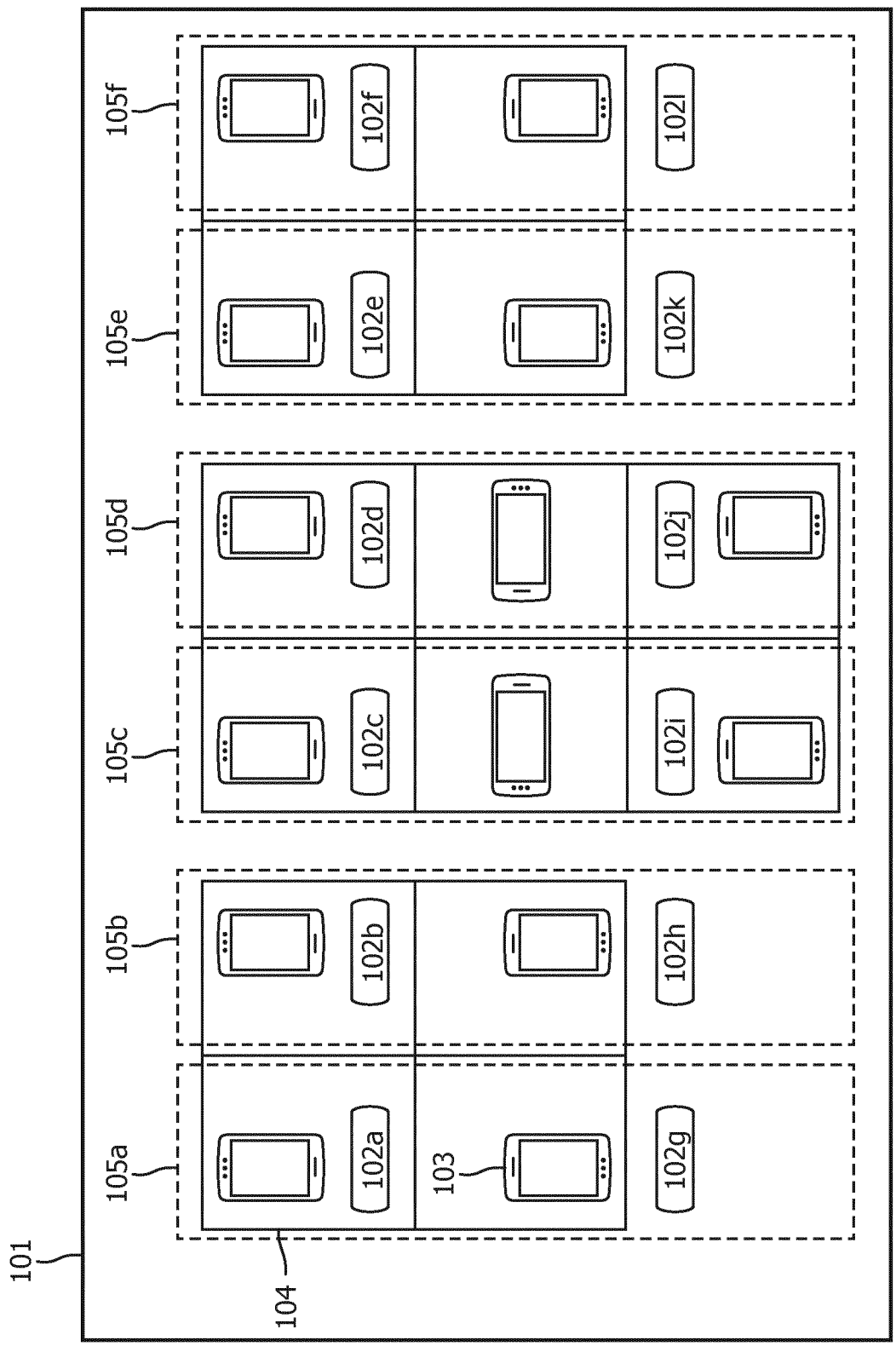
FIG. 1 illustrates an environment in accordance with embodiments of the present invention.

On the one hand, users with conflicting lighting preferences need to find consensus when sharing an environment. The success of finding consensus is directly related to the personality and behaviour of individual users, as each user has an impact on the shared environment and the choices each user makes can lead to discomfort of others. For example, the success of open plan offices is strongly dependent on user experience of which having light levels that users are comfortable with is an important part. Each user may differ with respect to their tolerance to lighting settings. For example, one of the users may be content with any lighting level, whilst another user may only be content with bright lighting.

In offices where personal light control is offered, the preference of a user does not depend only on environmental inputs, but also on character and behaviour of a user. Studies have shown that users have different preferences for lighting. Some might prefer bright light which makes them feel more energized, some find dimmed light more relaxing for their eyes, and some may not have a specific preference but only want to be able to perform a visual task. People also differ in their sensitivity to light. Some people might need more light to perform the same visual task, some might experience discomfort glare with high light levels, and some might not see the difference.

Additionally, peoples' differing personalities can also influence how they interact with their environment in an office. Some people may be more dominant (or vocal) and feel less hesitation in expressing their preference, whereas other people might show a more submissive (or modest) behaviour. Moreover, due to their sensitivity to light, there might also be a difference in how picky people are in their selection of preferred lighting. For example, some people may be satisfied with any lighting level (within the range typically offered in an office) whereas other people may be very specific about what they consider an acceptable lighting level, and may not be satisfied with the lighting conditions if the lighting level strays too far from their preference.

These personal characteristics influence people's preferences, and their selections when given a choice enabled with consensus control in an open office. The described embodiments of the present invention distinguish these characteristics and enhance satisfaction of users who experience difficulties in finding consensus in an open office.

The solution of the described embodiments of the present invention provides semi-automatic office lighting control based on user control behaviour taking user character information into account when proposing a new light level. With this solution, users that are unsatisfied with consensus control, due to conflicting preferences with their neighbours with whom they need to share controls, can be satisfied.

An important aspect of the described embodiments is that each user in a shared area can independently exert control over the lighting system, overriding the other user(s) in the area. The system, in turn, learns the preferences and tolerances of the users who choose to exert this control (active users). By monitoring how users actually choose to set the illumination levels in the shared environment, the system can more accurately gauge their true preferences and tolerances, of which these users may not even be consciously aware. However, users who choose not to exert this control (inactive users) are identified by the system and asked for feedback on the illumination of the shared area. Note that users may be inactive for multiple reasons. For example, a user may be satisfied with the lighting and therefore do not input control commands. These users are satisfied inactive users (they are just happy with what they get and that is why they do not react). On the other hand, a user may be unsatisfied with the lighting but too reluctant to make control actions. These users are submissive inactive users.

Moreover, in terms of user experience, having individual control over the illumination of the shared area is beneficial, but not to the extent that the desires of dominant users are imposed on submissive users. Advantageously, the described embodiments provide a balance between on the one hand the freedom of individual control and on the other hand fairness for dominant and submissive users alike, accounting for their individual tolerances.

A common practice in open plan offices is to have a regular grid of luminaires and lighting is designed in advance without actual knowledge of what would be the layout of the office. The regular grid of luminaires is commonly designed based on lighting distribution calculations to satisfy certain requirements e.g. that 500 lux is achievable at the user's desk. Although these requirements may prescribe illumination levels for different interiors, types of spaces, users' tasks as well as illumination of desk and surrounding areas, in practice the office illumination is set at a constant level. As a result office lighting does not account for the diversity of individual lighting preferences. It builds on an assumption that there is a global preference function for all users.

Due to a broad range of individual light preferences that are very diverse, it is impossible to create satisfactory lighting conditions for all by providing users one lighting condition. Therefore, personal control for office lighting should be offered to the users. When users can adjust the light level at their desks, it has a positive effect on their satisfaction with their environmental conditions, with lighting quantity and quality, mood and also, productivity being improved. Besides, occupants that have more opportunities to adapt their environments to their own needs are less likely to experience discomfort. On the other hand, having a workspace without some degree of control over environment, leads to increased discomfort and stress.

Offices in modern commercial buildings are rapidly transforming into multiuser environments that stimulate a collaborative way of working. State-of-the-art lighting systems enable granular control. However, it is challenging to provide a solution on how multiple users in an open office with different lighting preferences can be offered lighting control and find consensus in selecting a light level that is satisfactory (or at least acceptable) to all.

The multiuser environments commonly have a regular lighting grid that does not match the furniture layout. In multi user office spaces, luminaires are often grouped into control zones, offering equal control to all users located in the same control zone. Even with a consensus control, the majority of users experience the benefit of having their own controls, rating satisfaction with lighting quality and quantity higher when they have a controller than when they simply have to live with the current setting. However, a small portion of users that have opposing light level preferences will likely find it difficult to achieve a consensus.

On the other hand, some users may having a strong conflict avoiding behaviour. The control decisions of some occupants in the environment may be profoundly affected by the presence of others due their timidity to take actions that might cause discomfort to others.

Individually, the users may have different levels of tolerance which relate to their personality. The level of tolerance describes the user with respect to how much the light level needs to deviate from his/her preferred value before the user starts acting. This also relates to a dominant versus submissive pattern of behaviour. This behaviour manifests itself in either being a dominant user, who feels comfortable in changing a light level in presence of others or being a submissive user who does not change the lighting conditions to avoid a conflict. Since in multiuser environment social dynamics plays an important role in influencing how people interact with lighting controls, and the described embodiments take this influence into account.

FIG. 1 shows an environment 101 such as an office space which is illuminated by a plurality of luminaires 102a-1. The luminaires 102a-1, along with suitable wired or wireless communication means and other elements (not shown in FIG. 1) to be described later in relation to FIG. 2, form a lighting system (201, FIG. 2). Within the environment 101 there may be a plurality of users, and each user may have their own personal user device 103 such as a smart phone. For the sake of clarity, the users themselves are not shown in FIG. 1, but it is understood that a respective user is present within the vicinity of each respective user device 103. In FIG. 1, each user device 103 is shown on a respective desk 104. I.e. each user within the environment 101 may have their own work station (though which user is associated with which work station may vary over time).

As mentioned earlier, it is often impossible to offer a personal luminaire to each user and the common practice is to combine several luminaires into one control zone. FIG. 1 shows six control zones 105a-f, each containing two luminaires, though any number of control zones, each containing any number of luminaires may be present. The two or more luminaires in each control zone are not independently controllable, so only a single illumination level can be set in each control zone at any one time. Additionally, it is noted that FIG. 1 illustrated the control zones 105a-f as rectangles containing a single column of luminaires within the environment 101. However, in general control zones may be of any size or shape (e.g. luminaires 102a, 102g, and 102h could form a control zone) and need not be contiguous (e.g. luminaires 102d, 102e, and 102h could form a control zone). Either way, the luminaires within a given control zone act as one.

In consensus control, users nearest to a given control zone are given control over luminaires in that zone and several users may belong to the same zone. Control actions of one user will influence the lighting conditions of all users in his/her zone.

It is noted that the environment 101 is illustrated in FIG. 1 with one user device 103 per user and one user device 103 per individual desk 104, but it is appreciated that other combinations are possible. For example, there may be more than one user per desk, and some users may not have user devices. Similarly, FIG. 1 shows twelve luminaires 102a-1 and six control zones 105, but it is appreciated that any number of luminaires and control zones may be employed.

Figure 2:
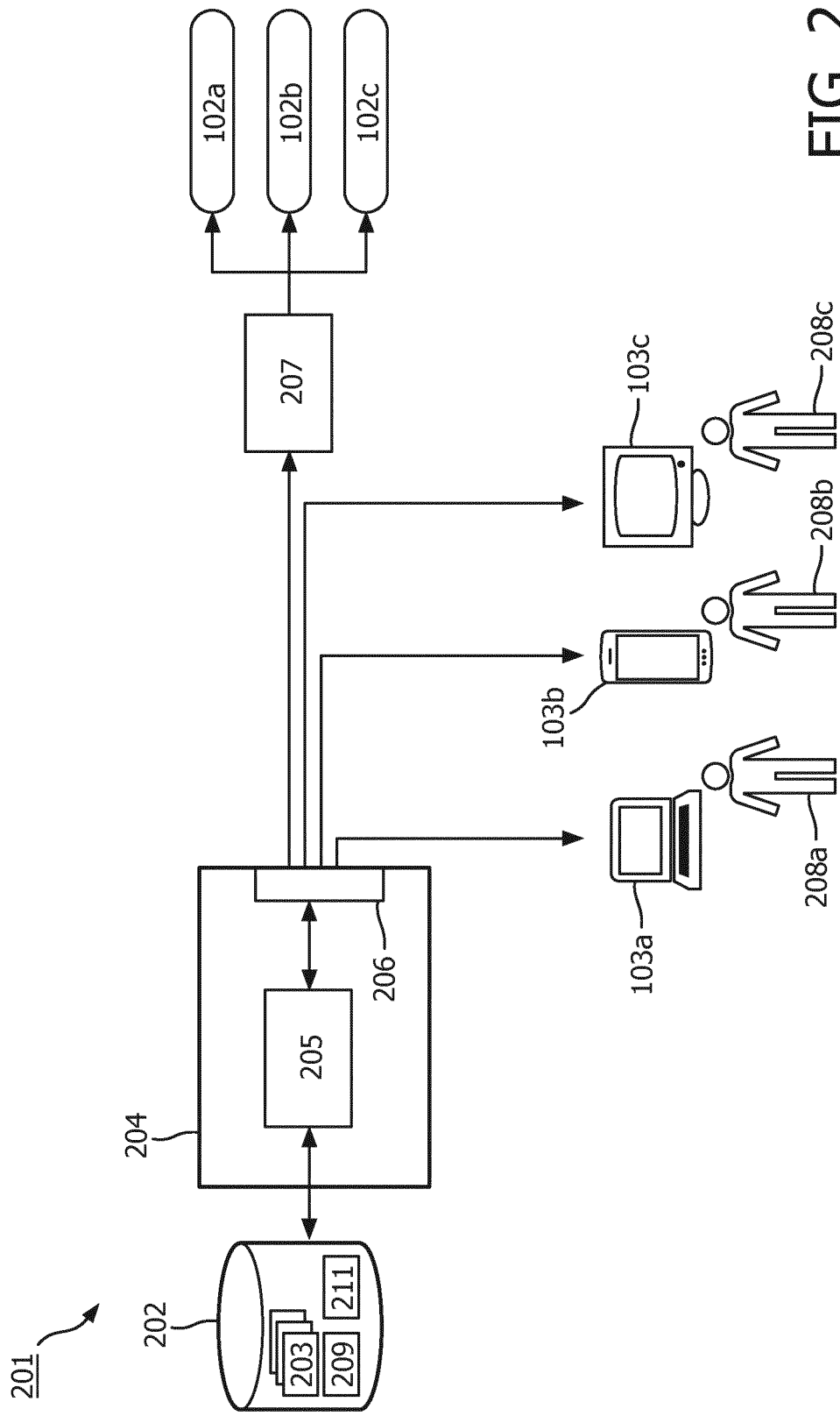
FIG. 2 is a schematic showing a lighting system according to embodiments of the present invention.

FIG. 2 shows the lighting system 201. The system comprises a memory 202, a controller 204, a plurality of user devices 103a-c, a gateway 207 and the plurality of luminaires though only three are shown: 102a-c. The memory 202 is shown as external to the controller 204 but may in general be implemented as one or more memory units either external or internal to the controller 204. The controller 204 is a computer system (e.g. a computer device), which comprises a processor 205 and a communications interface 206 via which it may send and receive signals to and from the plurality of user devices 103a-c. The communications interface 206 also allows the controller 204 to communicate luminaire control signals to the gateway 207, and receive feedback from the user devices 103a-c. As known in the art, the signals sent to the gateway 207 from the controller 204 may be in accordance with a first communications protocol which the gateway 207 receives and translates into a second communications protocol before transmitting control commands to the luminaires 102a-c. It is appreciated that the connecting arrows shown in FIG. 2 represent communication pathways which may be wireless or wired. FIG. 2 shows three users 208a-c (one user per user device 103a-c) but it appreciated that any number of users and user devices may be present.

The memory 202 stores a database of user profiles 203 (as outlined later in relation to FIG. 4). The users 208a-c can each provide user input using their user device 103a-c. This user input is used by the controller 204 to update and maintain the user profiles 203 stored in memory 202, as described below.

Figure 2A:
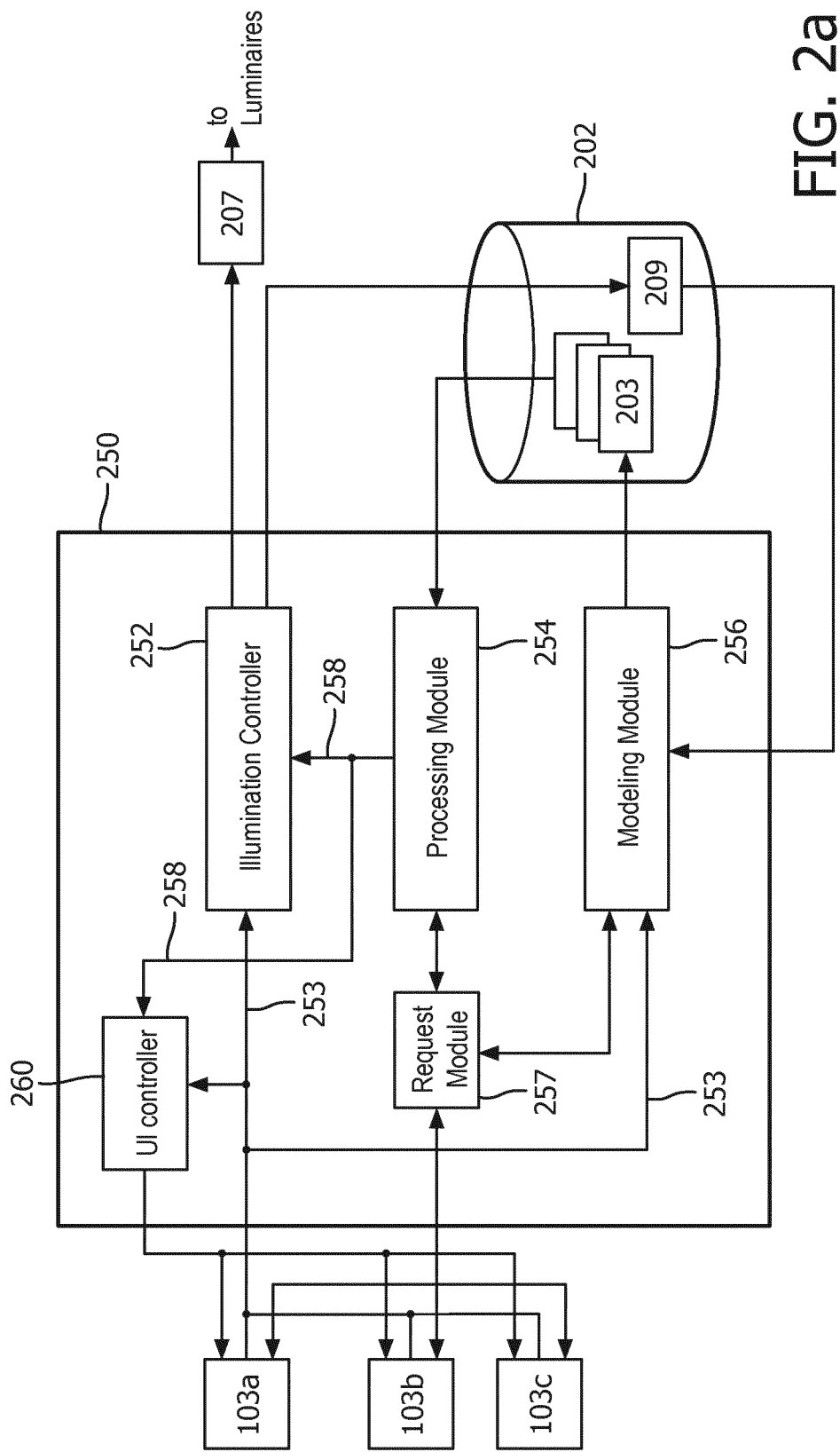
FIG. 2a shows a control system.

FIG. 2a illustrated schematically a control system 250 as implemented on processor 205. The system 250 comprises an illumination controller 252, a processing module 254, a modelling module 256, a request module 257, and a user interface (UI) controller 260. These are functional modules, each representing respective functionality implemented by executing lighting system management code on the processor 205.

The control system 250 has three different modes of operation for each control zone 105:
  a default mode. When users come for the first time into control zone, the default light level (e.g. 300 lux) will be offered to the users;
  a manual control mode, in which any user in that control zone can set the illumination level in that control zone individually, overriding any previous setting by another user in that control zone. Whenever user provides a control action, by overriding the current illumination level, the system will go to the Manual mode;
  an automatic, consensus-based control mode, in which the illumination level in that control zone is set to a consensus illumination level, based on preferences and tolerances of at least some of the users in that control zone which have, where possible, been learned according to how they have chosen to exert control over the illumination level in that control zone in the manual control mode. This is consensus—based control mode. If nobody manually overrides the current light level, the system will automatically generate the light level based on the user profiles in the control zone.

Preferably, the default mode is overridden immediately after a first control action from any of the users in a control zone. The system will never come back to this mode again (except in exceptional circumstances e.g. if a user performs a factory reset). When that user provides the control action, the illumination controller 252 switches to the manual mode in response, wherein the illumination level is set as instructed by a single user, which can be overridden by any other user at any time. After the space is vacant, and then occupied again (e.g. after working hours and then in the morning), the system switches to the automatic mode to automatically provide a light level based on profiles of the users that are currently present (automatic mode) or in case presence data is not available based on the consensus illumination level. If somebody overrides this setting, the system goes to manual mode and so on. Each control action is performed at the relevant user's personal device, and causes the device to instigate an appropriate level adjustment instruction to the controller 202.

For example, the switch from the manual mode to automatic mode may be triggered by the illumination controller 252 based on a predetermined lighting schedule (211, FIG. 2) stored in the memory 202 so as to switch at a predetermined time of day e.g. midnight. Alternatively or in addition, it may be based on sensor signals from one or more occupancy sensors arranged to provide sensor coverage of the control zone. E.g. the illumination controller 212 may switch from manual to automatic at a certain time(s) each day, provided the control zone is unoccupied at that time.

Examples of suitable occupancy sensors include PIR sensors embedded into every luminaire or otherwise located to provide sensor coverage of the control one, camera sensors installed in the room to detect people in the control zone, WiFi sensing to perform indoor localisation via a mobile smart device etc.

This is just one example of how a mode switch from manual to automatic may be triggered. Alternative mode switch mechanisms include but are not limit to those described below.

For example the illumination controller 212 could also switch from manual to the automatic mode if not further level adjustment instruction is received for a predetermined amount of time (e.g. in XX minutes/hours). The automatic behaviour will then incorporate the feedback/input of the user in the described manner.

This timer X could be set for example at 15 minutes, 4 hours, or any other suitable duration depending on the individual circumstances.

Another way of switching back from the manual to automatic mode is by introducing a button or other display element in the UI, e.g. multiuser mode. When multiple people are present in the same zone, they could voluntarily switch into multiuser mode, in case they consider it to be a better option for finding consensus.

As another example, if only a single user is be present in the control zone, the system may detect that only the single user is present, and switch the system into the manual mode with the light level set to that preferred by that individual user. If there are multiple people in the zone, the system could switch to the automatic multiuser mode.

More generally, the lighting level could be set by combining the profiles of only the users that are detected to be currently present in the control zone.

When operating in the manual control mode for one of the control zones, illumination controller 252 responds to level adjustment instructions 253 for that control zone from individual user devices to allow individual control (not consensus-based) of the illumination level of that control zone. Each of the level adjustment instructions 253 is instigated by a respective one of the users 208 in that control zone at their device 103, and denotes an illumination level instructed by that user for that control zone. Each time a level adjustment instruction is received in the manual control mode, the illumination controller 252 controls the luminaires in that control zone via the gateway 207 to set their illumination level to that instructed denoted by the received level adjustment instruction. Accordingly, in the manual control mode, the illumination level in that control zone is set to that denoted by the most recently received level adjustment instruction.

For each control zone, historical illumination settings data 209 is stored in the memory 202, and updates over time as new level adjustment instructions 253 are received. The historical data 209 conveys a plurality of illumination levels instructed in the manual mode and, for each of those levels, a duration for which the illumination of that control zone remained at that level, and an identifier of the user who instructed it.

Modelling module 256 analyses the control instructions 253 received to generate profiles of the users in each control zone (i.e. user models), in the manner described below. That is, the modelling module 256 analyses the controlling behaviours of users in the control zone exhibited in the manual operation mode in order to generate their profiles. The modelling module 256 can also ascertain user profile information for a user even when that user does not explicitly provide control instructions. For example, if user 208a sets a light level in manual mode to a certain value (e.g. 100%), but also user 208b experience that for a certain time, the profile of the user 208b can be updated taking the light level (100%) and duration of it (2h), into account. In this scenario, user 208b did not set the light level, but did not change it either: he accepted it. Therefore, modelling module 256 can generate the profile of user 208b based on this information.

Processing module 258 processes the users' profiles 203 to determine a consensus illumination level 258 for each control zone where necessary, in the manner described below. In the automatic control mode, the illumination controller 252 controls the luminaires in that control zone to set their illumination level to the consensus illumination level 250.

The UI controller 260 transmits UI rendering data to the user devices 103a, 103b, 103c to allow them to display a UI pertaining to their control zone. Among other things, the UI indicates which mode their control zone is currently being operated in, and the current illumination level of that control zone. In the manual control mode, the current illumination level is that instructed by the most recently received of the level adjustment instructions 253; in the automatic control mode, the current illumination level is the consensus illumination level 258.

Figures 3, 4:
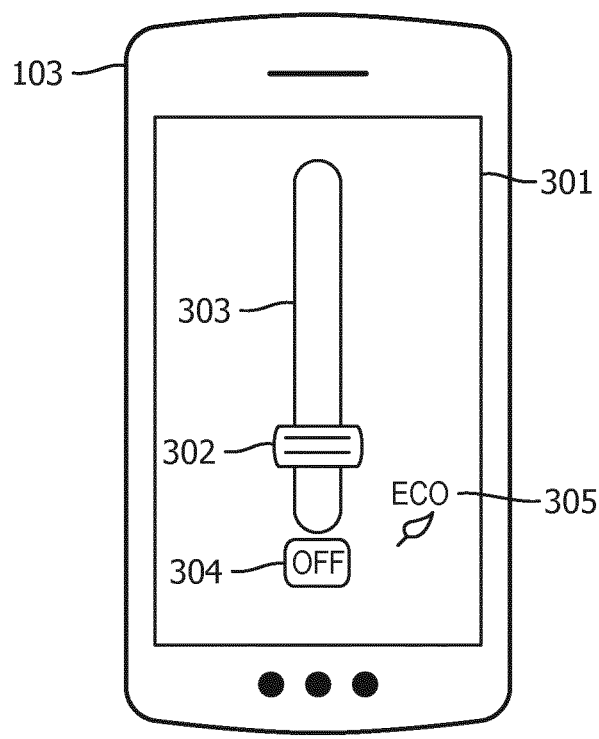
FIG. 3 illustrates an example of a graphical user interface implemented on a user device.
FIG. 4 is a schematic showing an example data structure.

The users 208a-c provide the aforementioned user input via the UI when displayed on their user devices 103a-c, which may take the form of a graphical UI as illustrated in FIG. 3. For example, the respective user of a given user device may move slider 302 up or down bar 303 in order to instigate level adjustment instructions 253. In general, locations of sliders along the bar 303 may be used to graphically illustrate lighting levels, though it is appreciated that other forms of graphical representation may also be used (e.g. a wheel). Using a slider on the bar 303, the UI controller 260 may also suggest lighting levels to the user through the UI by displaying a suggesting lighting level on the screen 301. Embodiments including various example UIs are described later in relation to FIGS. 15a-c. For example, the UI may also include an OFF button 304 by which the user may turn off some or all of the lights (e.g. the lights within his respective control zone, or all the lights in the environment). FIG. 3 also illustrates an ECO icon 305 which may be used in conjunction with embodiments described later in relation to FIG. 14 which allow the system to achieve power savings.

A user could still add to the system as a default user when no interaction action as well as no feedback is given to the system. Default mode will also be when the first user that occupies the space does not have a preference profile yet that would introduce adjusted automatic behaviour.

A user profile 203 is illustrated schematically in FIG. 4. The user profile 203 is a data structure having a plurality of fields: a user ID field, an active field, a dominance field, a satisfaction field, and a preference field which can be populated with a user ID 401, an activity indicator 402, a dominance indicator 403, a satisfaction indicator 404, and preference data for the user 405, respectively. The ID 401 is used to identify the user to which the profile 203 pertains. For example, this ID 401 may be any suitably identifying value, for example a user name or alias associated with the user of a user device, or a value associated with the user device itself such as a MAC address. The activity 402, dominance 403, and tolerance 404 indicators in the user profile 203 indicate behaviours of the user, as outlined below. In the described embodiments, these are binary indicators indicating respectively whether the user is active or inactive, dominant or submissive, and satisfied or unsatisfied.

As will be apparent in view of the following, the active field and satisfaction field can be left unpopulated for dominant users in some cases, as can the preference field for satisfied users in some cases.

The user profile 203 is associated in the memory 202 with the control zone to which it pertains. Though, as appreciated above, in a flexible working environment a user might belong to multiple or changing zones, in which case the user profile 203 is associated in the memory 202 with the control zone the user is currently in (as may be identified based on his control input, or by known positioning methods such as indoor positioning systems or tracking him and/or his device by some other tracking means) For example, it may comprise a control zone ID of that control zone, or the user identified in the user ID field may be associated with that control zone in the memory 202.

Users can be:

Active or Inactive which relates to the frequency of users' control actions changing the light level. The level of activity of each user is determined based on the frequency of user actions. If the modelling module 256 detects an active user, deriving his/her profile will be facilitated. On contrary, if a user is classified as an inactive user, additional input from the user will be requested in order to derive his/her profile as accurate as possible.

Dominant or Submissive depending on whether a user feels free to change the light level in presence of others or this represents a blocking factor for him/her due to conflict avoiding behaviour. The dominance of the user is reflected in terms of his ability to set his preferred light level regardless the presence of other people in his/her control zone. Dominance could also be observed via a correlation between a particular user choices and the prevailing luminaire output in that zone. It could signal that some users do not have enough courage to override a light level in a zone. Submissive users are intimidated by the others, and manifest conflict avoiding behaviour in terms of not changing the lighting level even when they are unsatisfied. If the modelling module 256 detects a submissive user (inactive user, no correlation with zone output), the request module 257 will ask for additional input from a user that will be recorded but not sent to the control system 250. This input will affect user profile and will be taken into account when deriving a new control output.

Tolerant or Intolerant which relates to how broad the range of light levels a user would accept without initiating a change. A tolerant user would not be very picky in his preference. This might be reflected in a broad range of selected light levels by that user. In contrast, an intolerant user would have very "picky" profile. This user would demonstrate more consistent choices of the light levels he would select.

Due to the individual behaviour variation of the plurality of users 208a-c, any given control zone may contain a variety of combinations of different user behaviours. There are four main cases:

Case 1: All users in a control zone are active and have matching lighting profiles in terms of preferred light level.

Case 2: All users in a control zone are active, but lighting profiles of two or more users are conflicting e.g. user who likes bright vs. user who likes dark lighting conditions.

Case 3: One or more users in a control zone are inactive and have matching lighting profiles.

Case 4: One or more users in a control zone are inactive and have conflicting lighting profiles.

Case 1 represents the users that are active and have matching lighting profiles. These users will provide enough feedback to the request module 257 so that their profiles can be easily evaluated and if they have similar preferences regarding lighting conditions, it can be assumed that these users will be satisfied with the fact that personal control is offered to them. That is, such users need no more than a sense of individual control over their illumination for optimal satisfaction—conflicts need not be accounted for.

In Case 2 the users are once again all active, but they have conflicting lighting profiles. Their profiles can be easily evaluated, but their satisfaction with the lighting conditions will be low, since they experience conflict.

If there are one or more inactive users in a control zone, depending whether they are satisfied (i.e. have matching lighting profiles with their neighbours) or dissatisfied (i.e. have conflicting lighting profiles with their neighbours), they can be classified as Case 3 or Case 4, respectively. In these cases, additional inputs are required from those inactive users in order to further evaluate their profiles and discover whether these users are satisfied or dissatisfied with lighting conditions in their zones.

Since the goal of a good lighting control system is to increase the user satisfaction, the user profiles of case 2 and 4 demonstrate a challenge to consensus control in satisfying users. To take this into account the present invention proposes a solution of how lighting can be offered enhancing the satisfaction of the users as described in case 2 and 4. In this solution, each user is able to override the illumination controller 252 in terms of setting a preferred light level under current conditions. This input is recorded and used to classify the users as described in embodiments below.

The processing module 254 takes into account the profiles of a plurality of users and determines a consensus lighting level. In order to do this, the processing module 254 may employ the example method as illustrated in FIG. 5.

For the purposes of explanation, the described embodiments of the present invention model each user based on his input using a Gaussian function, having a mean that corresponds to the most preferred light level and a standard deviation that characterises the tolerance of the user, and combines different user profiles by taking a product of the two Gaussian curves. For non-dominant users that are not actively overriding the lighting, the present invention first asks the user for his level of satisfaction. If not satisfied, the user is asked which light level he prefers. Based on this input a light level for a zone will be derived by the processing module 254 that fits the preferences and the way users behave in presence of others.

Figure 5:
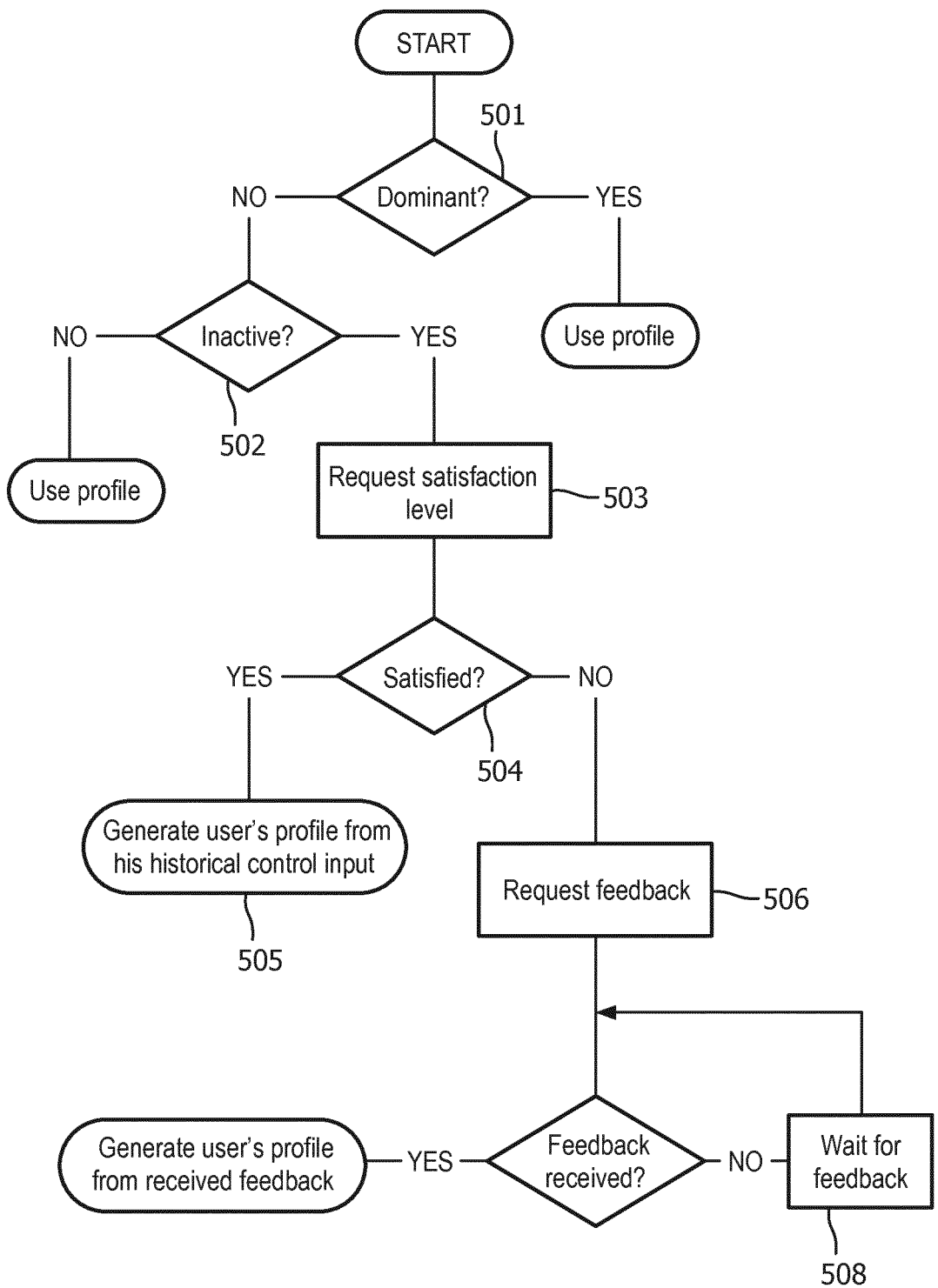
FIG. 5 shows a method according to embodiments of the present invention.

FIG. 5 shows a flowchart illustrating an example method by which the processing module 254 may determine which users' profile information to consider when determining the consensus lighting level.

Firstly, at step 501, the processing module 254 determines whether the user is dominant. For example, by comparing the user's previous inputs with the luminaire historical settings data 209. This is described later in relation to FIG. 12. If the user is dominant, then that user's profile data is taken in to account. If the user is submissive (not dominant), then the method proceeds to step 502.

At step 502, the processing module 254 determines whether the user is inactive. If the user is active (not inactive) then that user's profile data is taken in to account. If the user is inactive, then the request module 257 of the control system 250 requests the user's satisfaction level at step 503 by sending a request to the user's respective user device pertaining to the user's preferred lighting level and satisfaction. This is described later in relation to FIG. 17.

The processing module 254 then waits for the user device to respond with the requested information. Note that step 503 may be performed only once, i.e. a time threshold (deadline) may be applied, and if the user does not provide input before the deadline then his profile is generated solely from his historical control inputs. I.e. the method may skip to step 505. If feedback of the user is received at any later moment in time, this evaluation of the lighting conditions at that moment are used to learn about the user profile and adjust the lighting accordingly if needed.

Alternatively, the request module 257 may re-request input a predetermined number of times, and/or at a predetermined frequency, e.g. initiated after a control action of another user in the zone. But could also be triggered after X hours of inactivity or whenever the inactive user initiates to provide this feedback himself. Either way, if feedback is received it is passed to the processing module 254 and the method proceeds to step 504.

At step 504, the processing module 254 determines whether the user is satisfied, i.e. has the user indicated via their feedback that they are satisfied with the lighting conditions or not. If the user is satisfied, then at step 505 the satisfaction field in their profile is populated to indicate this, and their profile need not be taken into account when determining the consensus lighting level 258. If, on the other hand, the user is not satisfied, then the satisfaction field in his profile is populated to indicate this and the request module 257 request feedback from the user, at step 506, concerning the user's preferred lighting levels. The system then waits for feedback (step 508) in a manner analogous to step 503, described above (e.g. for a predetermined amount of time etc.). Feedback of the user could be obtained in different ways, e.g. on a 7-point scale, a thumbs up or down, or a ghost slider of the light controller on which preference could be selected. Once feedback has been received, that user's profile is considered when determining the consensus lighting level 258 (as described later).

A classification example of users within the same control zone is presented in FIGS. 6-9. These Figures correspond to cases 1-4 presented above, respectively, and assume for the sake of clarity that there are only two users in the same zone and that their preference function can be presented as a Gaussian distribution. One user's preference function is shown as a solid line 601 and the other user's preference function is shown as a dashed line. The bell shape of the Gaussian curve corresponds to the assumption that each user has one preferred light level. Hence, it is appreciated that other shaped curves may be more suitable in different circumstances. Different standard deviations correspond to either one of two assumptions: 1) user is inactive and there is a lot of uncertainty regarding his preferred value or 2) user is very tolerant and can work under larger variety of lighting conditions—he is not a picky user.

Figure 6:
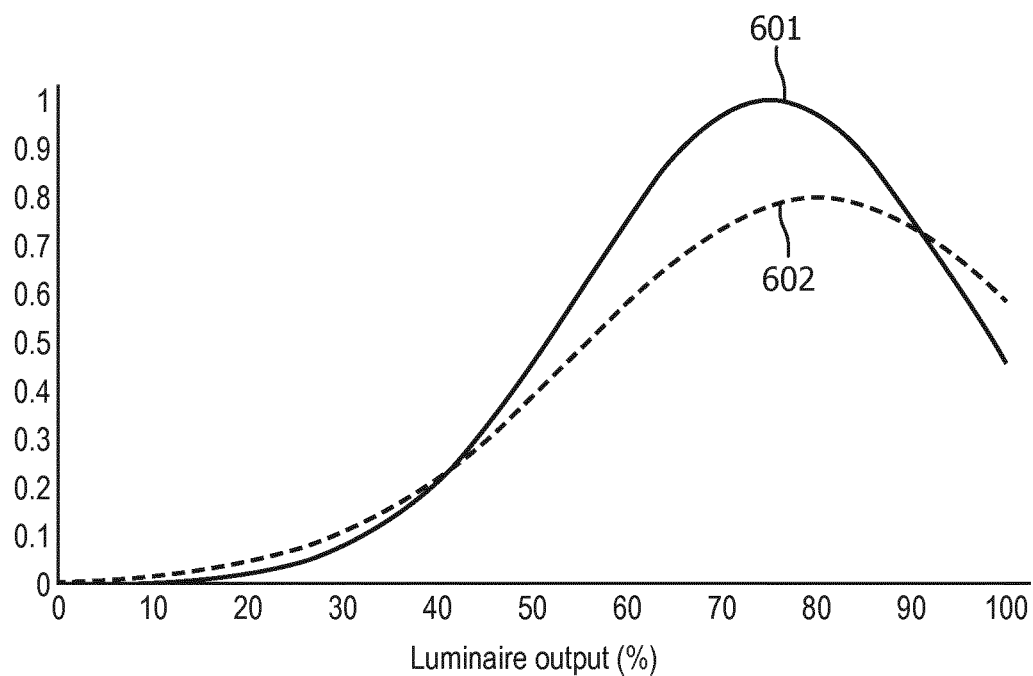
FIGS. 6-9 illustrate lighting examples lighting profiles.

In FIG. 6 (case 1) the users are active and with similar preferences—the mean value of their preference functions are 75% and 80% of the luminaire output, shown by solid line 601 and dashed line 602, respectively. The profiles of these users is easily derivable and it can be assumed that they will be satisfied with the lighting conditions.

Figure 7:
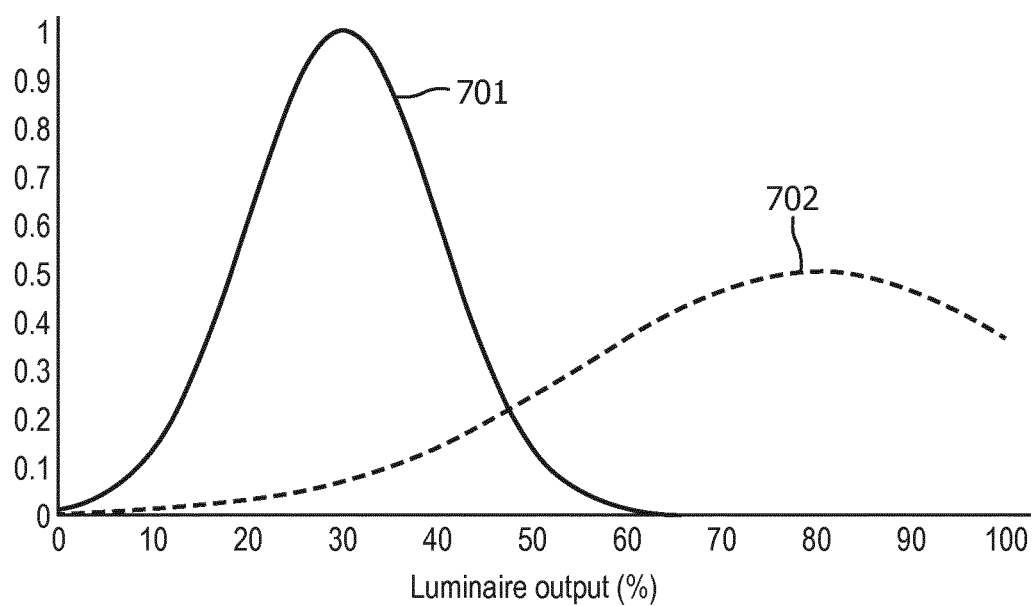

FIG. 7 (case 2) shows two active users in the same zone with conflicting profiles. I.e. one user indicated by solid line 701 has a mean of 30% and the other user indicated by dashed line 702 has a mean of 80%. For these users it can be assumed that at least one of the users will be dissatisfied with lighting conditions due to experienced conflict.

Figure 8:
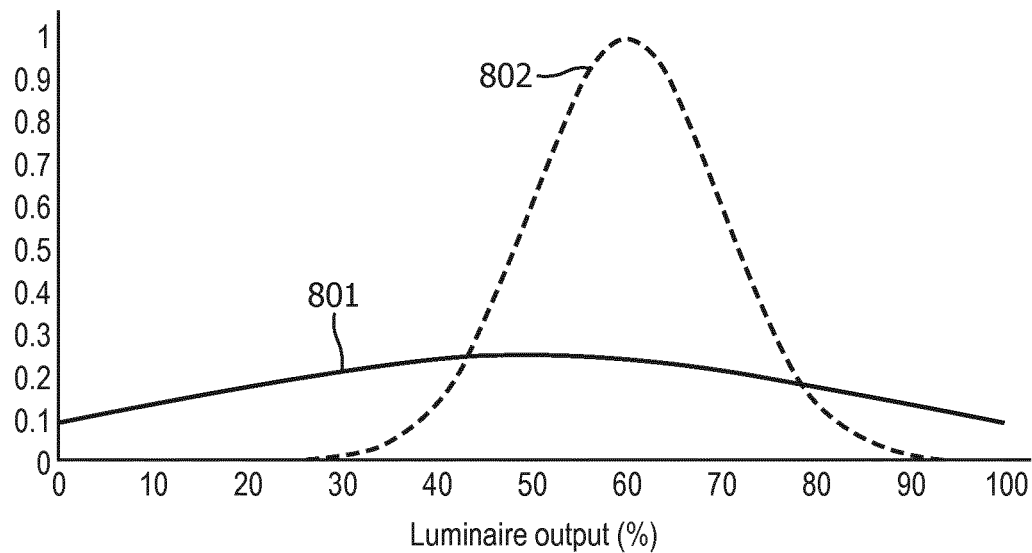

FIG. 8 (case 3) shows users that have matching profiles, where one user (solid line 801) is inactive and the other (dashed line 802) is an active user.

Figure 9:
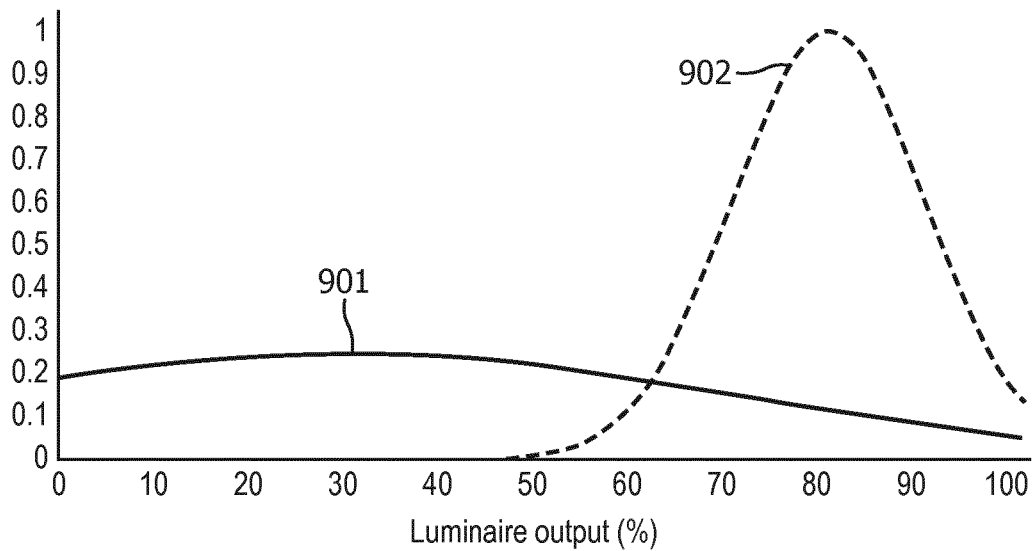

FIG. 9 (case 4) shows one active (dashed 902) and one inactive (solid 901) user with conflicting profiles, i.e. preferred values of 30% and 80% of the luminaire output, respectively.

In both, Case 3 and Case 4 we would need to acquire additional inputs from inactive users to be able to classify them as satisfied or dissatisfied.

Figure 10A:
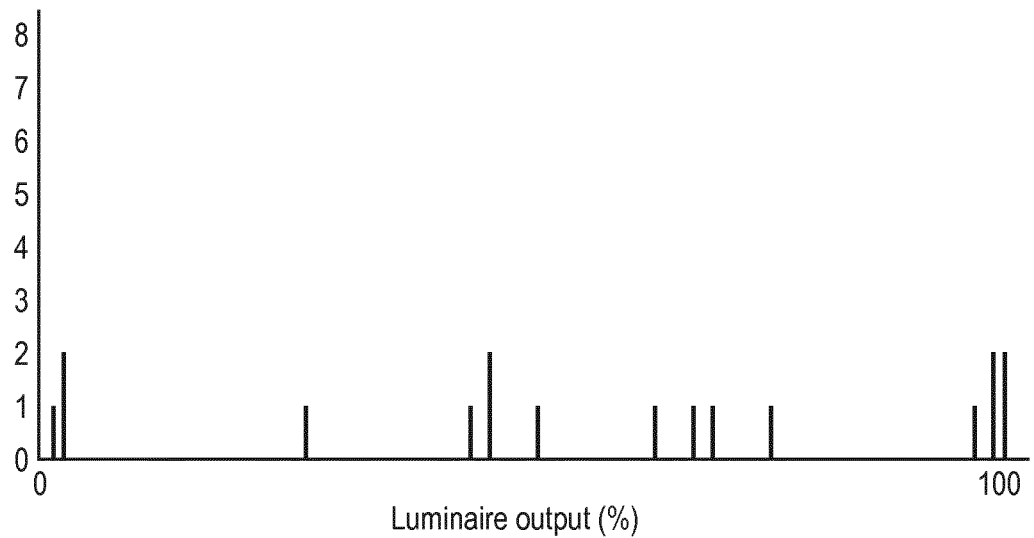
FIGS. 10a-b show example user input and a corresponding user lighting profile.
Figure 10B:
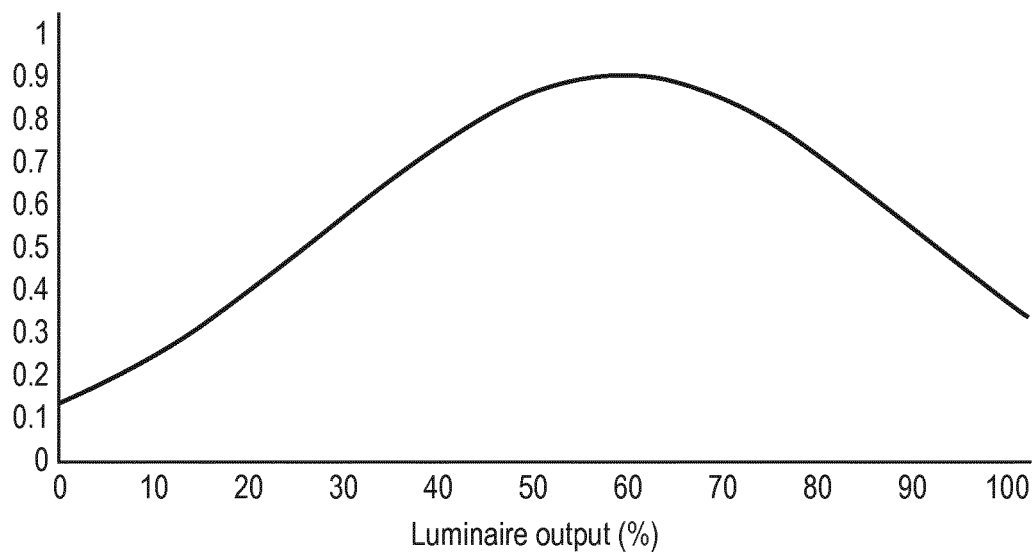
Figure 11A:
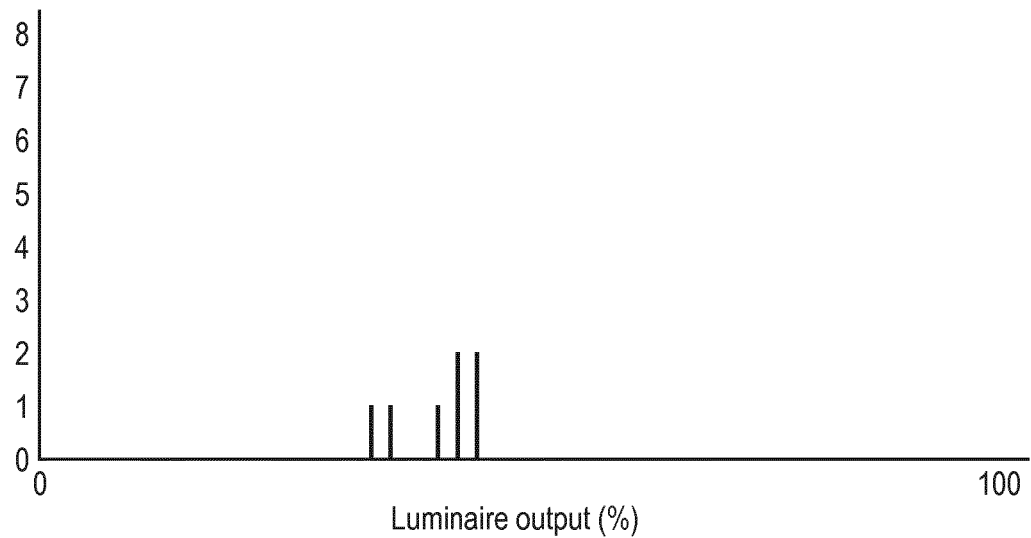
FIGS. 11a-b show another example of user input and a corresponding user lighting profile.
Figure 11B:
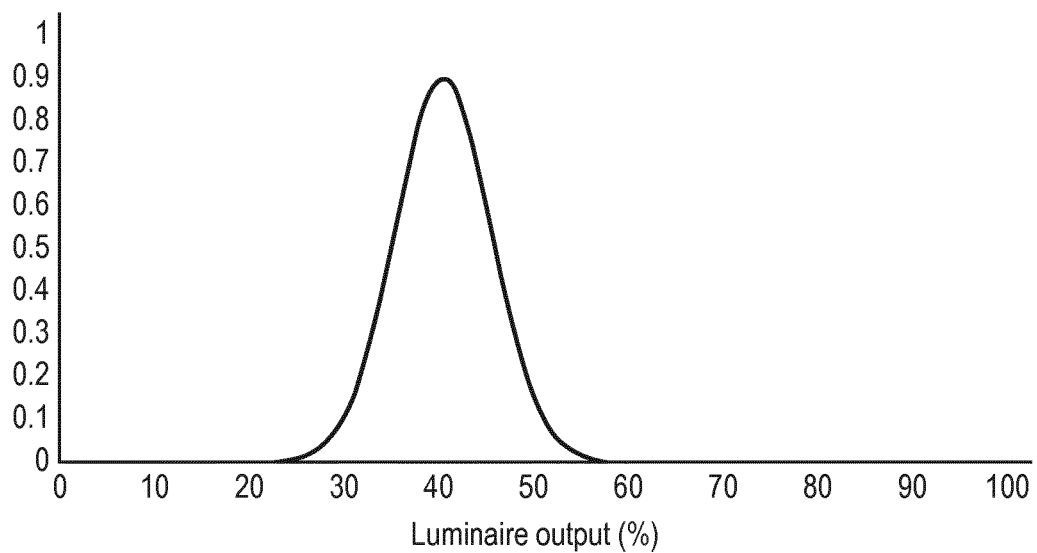

Regarding the level of tolerance, there are two classes of users—tolerant and intolerant. For active users that provide enough feedback to the system 250—for example by way of their level adjustment instructions 253, and/or via the request module 247—tolerance level can be distinguished through the standard deviation of their preference functions. If the standard deviation is small, the user is intolerant and he/she would act even when the lighting level deviates a little from his/her preferred value. On the other hand, if the value of standard deviation is large, the user can be classified as tolerant, since he/she can be satisfied with wider range of light values. Examples of this type of classification are shown in FIGS. 10-11. The x-axis in all figures represents the % of the luminaire output, while y-axis in FIGS. 10a and 11a represents the number of occurrences of the same light level (a histogram). The y-axis in FIGS. 10b and 11b is a scaled valued of the Gaussian function, as before. As can be seen, both FIGS. 10 and 11 show active users, except that in FIG. 10, the user is more tolerant (has a wider range of preferred light level) and in FIG. 11, user is intolerant which can be seen from the standard deviation of his preference function.

Figure 12A:
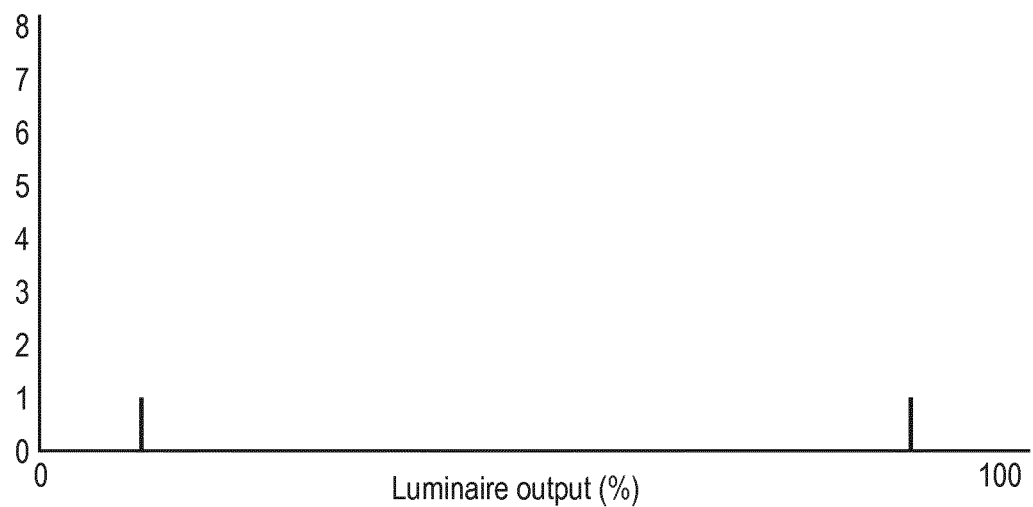
FIGS. 12a-c show two examples of user input history and a resulting lighting history.
Figure 12B:
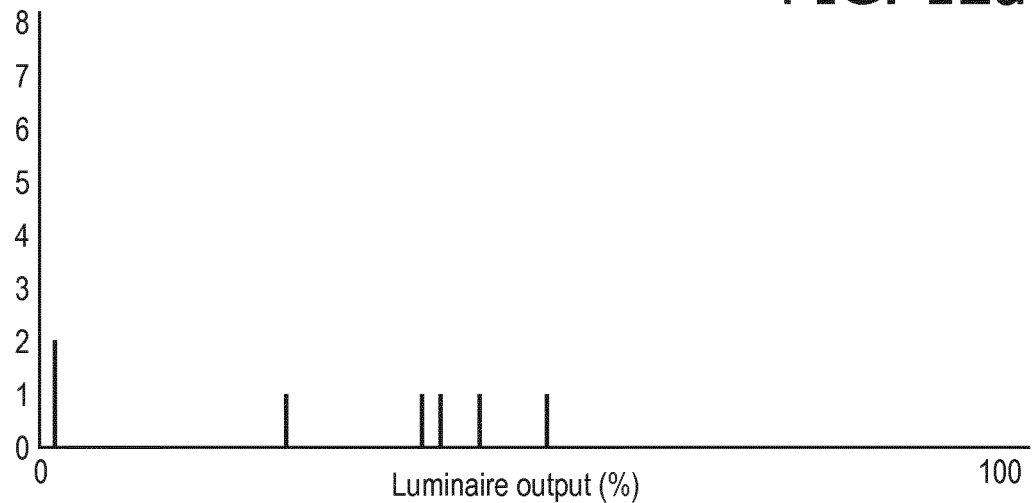
Figure 12C:
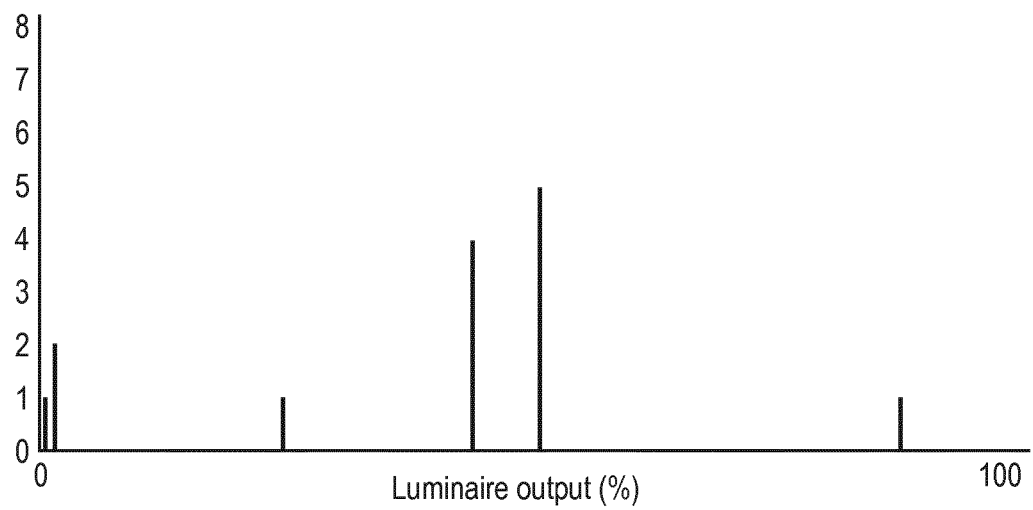

A dominant user can be either active or inactive. The dominance manifests itself in having a large influence on the zone luminaire output. Even in case a dominant user is inactive, he might influence other users in the same control zone in such a way that they would feel reluctant to change the light level set by the dominant user. When the user preference is known and it highly correlates with the zone luminaire output, the user could be classified as dominant in that zone. These two types of users, dominant and non-dominant, are presented in FIGS. 12a-c wherein the x-axis in all figures represents the % of the luminaire output, while y-axis in FIGS. 12a and 12b represents the number of occurrences of the same light level (a histogram) and in FIG. 12c represents minutes output of the luminaire being in a certain state. It can be seen that the user represented by the histogram of FIG. 12b is a dominant user, since the light levels that he chose were experienced the longest in the zone.

After a predetermined period, e.g. several weeks, during which the user would override the illumination controller 252 at least a couple of times, the modelling module 256 first classifies whether the user is dominant or not by checking the correlation with the zone luminaire output (as described above in relation to FIGS. 12a-c). If dominant, the user is probably satisfied, since his light level preference overlaps with the zone luminaire output. If the user is not dominant, the processing module 254 will check whether he is active or inactive. If active, the user most probably falls into case 2 classification, thus possible conflict with other users in the zone. The system 259 needs to support this user and offer a light level based on multiple profiles. If an inactive user is detected, the request module 257 needs to ask for additional inputs from the user:

Satisfaction level of the user—If the user is inactive, but satisfied, the system 250 will have a goal to provide lighting conditions that are in accordance with preferences of the other users in that zone, since that would be satisfying for this user. The request module 257 does not need to ask for additional input from user's side in this case.

On the other hand if the user is inactive, but dissatisfied, the request module 257 needs to get additional input:

Preferred light level of the user—In that case the request module 257 will receive the input, but the illumination controller 252 would not perform the light change. Instead, the profile of that user will be updated by the modelling module 256 and taken into account by the processing module 254 when a new light level is proposed in that zone.

When the classification of the users is performed, based on their characteristics the UI controller 260 proposes a new light level that is a weighted combination of the users' profiles (as determined by the processing module 254). The weighting is done by taking into account whether the user is tolerant or intolerant, such that a light level is shifted towards the preference of the intolerant user. An example method of achieving this is shown in FIGS. 13a-b.

Figure 13A:
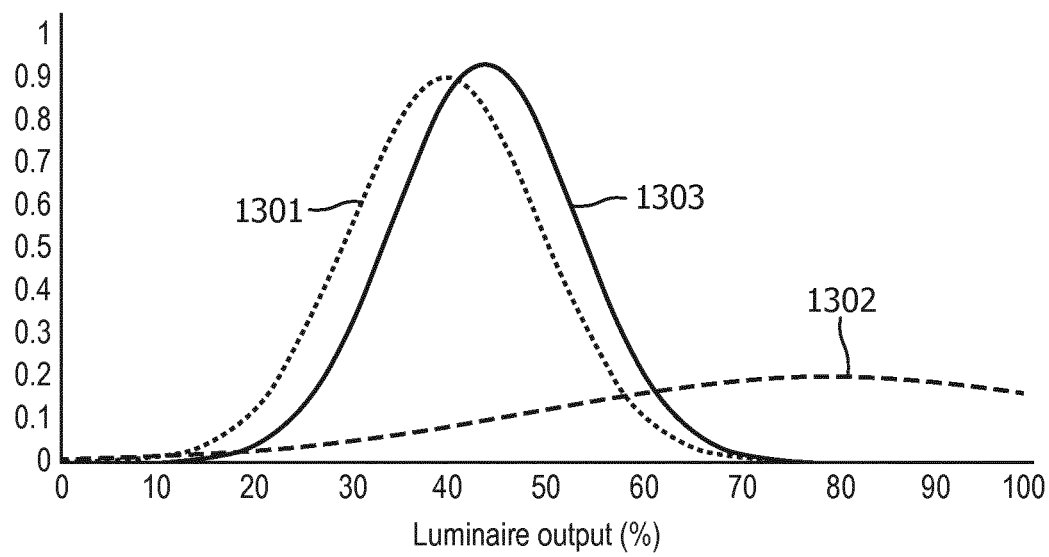
FIGS. 13a-b show example user profiles and their weighted averages.

In FIG. 13a, an intolerant user (line 1301), as indicated by standard deviation of his preference function that is around 10% of the luminaire output. The tolerant user is depicted by line 1302 with a standard deviation of around 40% of the luminaire output. Line 1303 is a weighted product of lines 1301 and 1302 and it can be seen that it is shifted towards the intolerant user. The mean of line 1303 (roughly 45%) is the light level proposed in the control zone for the two users.

Figure 13B:
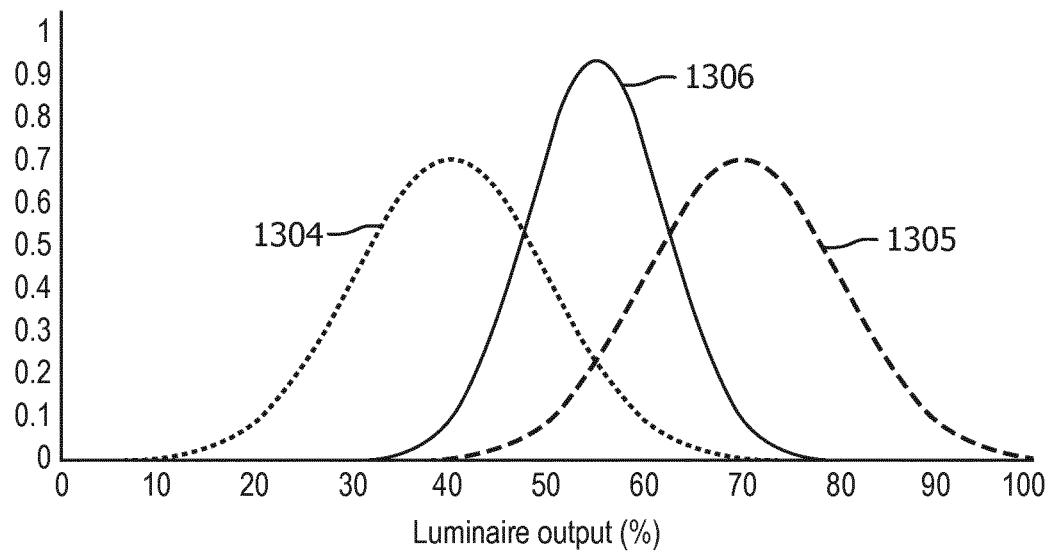

In FIG. 13b, there are two users, represented by lines 1304 and 1305, that are equally tolerant with a standard deviation of around 10% of the luminaire output. In this case, the UI controller will propose the light level that is right in the middle between two preference functions, as determined by the processing module 254. That is, the system 250 again proposes the mean of the weighted product 1306.

Figure 14:
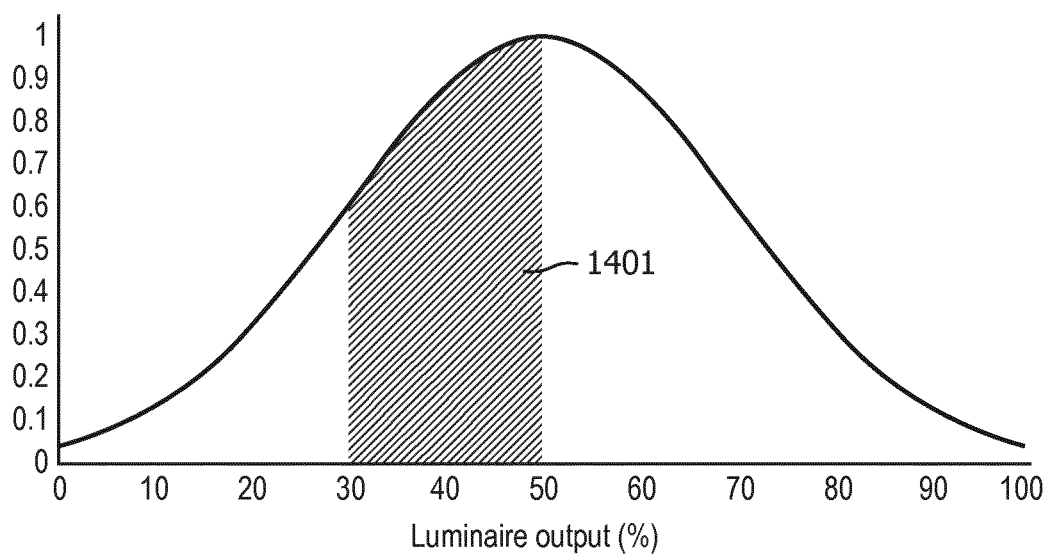
FIG. 14 illustrates an example of an acceptable deviation from the mean in accordance with embodiments of the present invention.

Embodiments of the present invention also make possible energy preservation measures. For example, by knowing the tolerance level per user, the processing module 254 can determine a light level that is lower than user's preferred curve mean but within twice his standard deviation ($\mu \pm \sigma$), which would be acceptable for that user and UI controller 260 can propose this light level to the user. An example of this is shown in FIG. 14. The preferred value of a user $\mu=50\%$ is the mean of the Gaussian, while area 1401 represents the area of $\mu-\sigma$ from which the system 250 can propose a light level, assuming that user will accept it.

As mentioned above in relation to FIG. 3, the user may be presented, via display 301, an ECO icon 305 which allows the above-described energy preservation measures to be toggled on/off. Alternatively, the user may be able to alter, via the UI, the number of standard deviations which would be acceptable for that user (two, in the above example).

As mentioned above, the UI may be controlled by UI controller 260 to receive user input and to suggest lighting levels to the users. This has an advantage of allowing dominant users to be more aware of their neighbours lighting preferences and hence allows to consider the desires of less dominant users within the environment.

In embodiments, the design of the UI for lighting control is enhanced with information about preferences of all users in a specific control zone. Therefore, all users can know the preferences of their neighbors as well as the resulting control light level determined by the processing module 254, as being proposed by the UI controller 260.

After the users have been classified (as outlined above), inactive users are asked for their satisfaction with current lighting conditions. If the user is satisfied, it can be assumed that he/she is inactive because the lighting conditions match his/her preferences (see Case 3). If user is dissatisfied, he/she represents a submissive user who is unable to express his/her preferences in presence of others (see Case 4). Submissive users may then be asked to additionally rate current lighting quantity e.g. on a scale such as a seven-point scale ranging from "Too little" to "Too much." Their feedback is automatically learned by the system 250 (i.e. modelled by modelling module 256 and stored in memory 202) and taken into account when proposing a new light level.

Figure 15C:
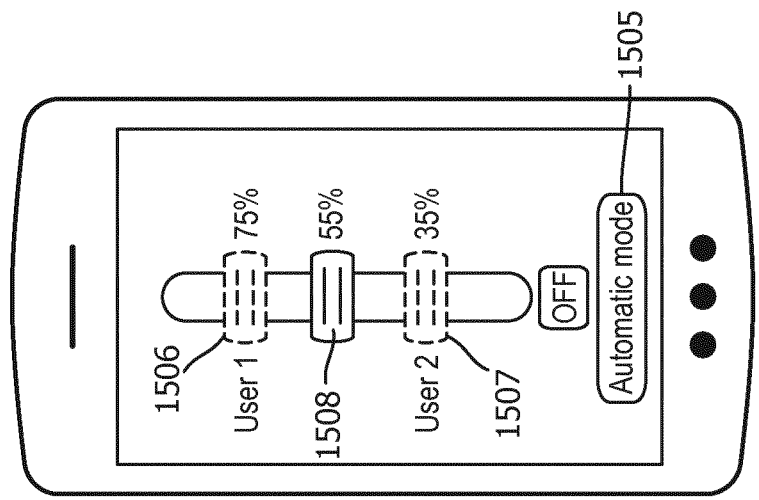
FIGS. 15a-c show three example modes for a user interface.
Figure 15B:
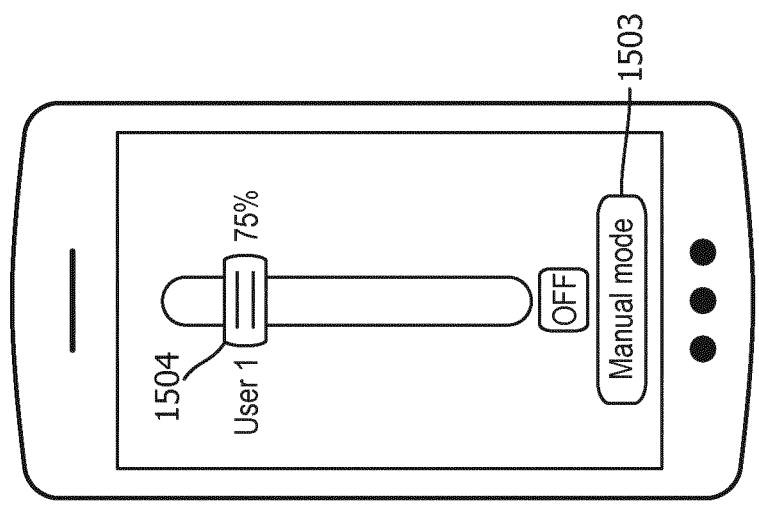
Figure 15A:
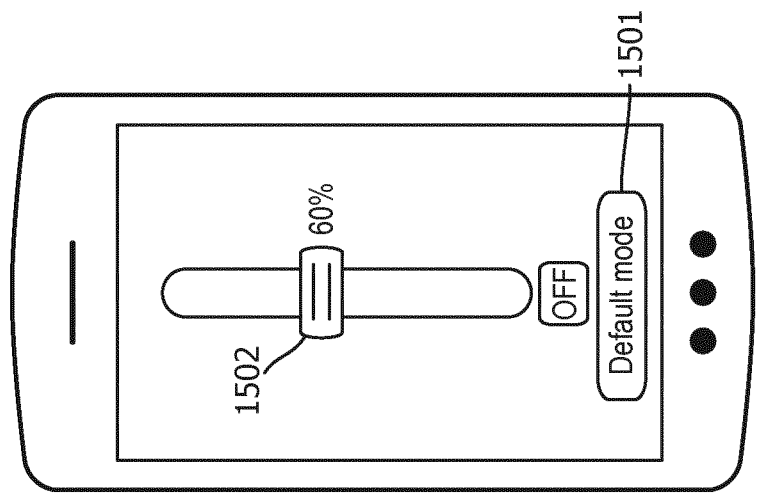

FIGS. 15a-c show three example modes for the UI: default, manual and automatic, respectively.

Figure 16B:
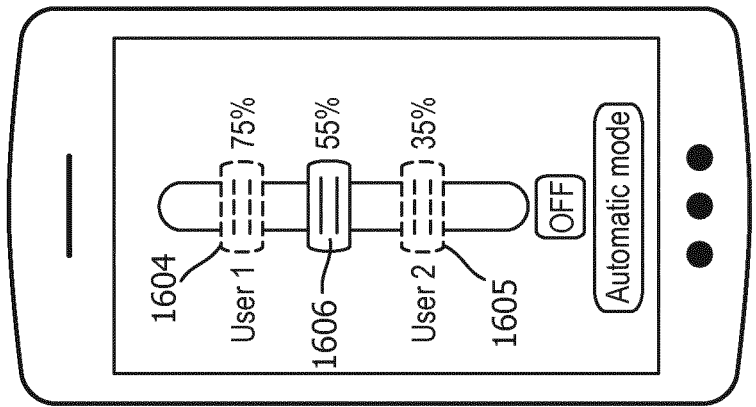
FIGS. 16a-b illustrate examples of how the user profile information of FIGS. 13a-b may be displayed on a user interface.
Figure 16A:
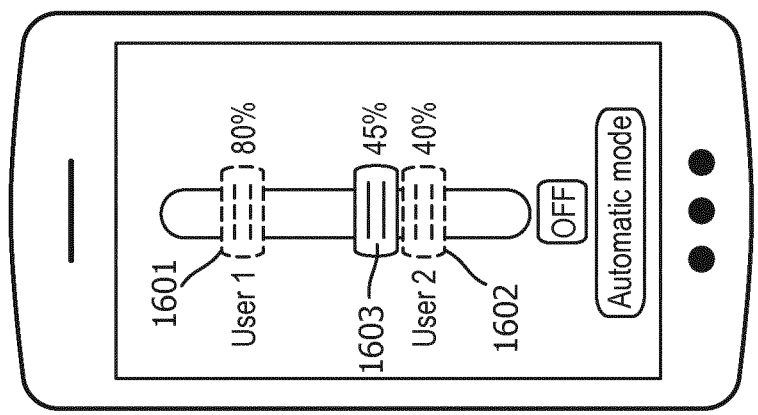

1. Default mode. In the Default mode, as indicated by mode 1501 in FIG. 15a, an initial light level 1502 is be offered to the users e.g. 300 lux. FIG. 15a shows this initial light level 1502 displayed as a set level on a graphical slider, but it is appreciated that any suitable means of representing a light level may be used.
2. Manual mode. Whenever any of the users in the zone performs a control action, the system 250 will automatically go to Manual mode and adjust the light level according to the user's performed input action. All users in the zone will receive the information (via their respective UI) that the system 250 is in the Manual mode and the ID of the user who performed the action will be displayed on the user interface. For example, FIG. 15b illustrates what may be displayed to all the users to indicate, via slider 1504, that "User 1" has adjusted the lighting level to 75%.
3. Automatic mode. After each user action, the modelling module 256 updates his/her preference function stored in memory 202 accordingly. The preferred light level per user is retrieved from the user's profile 203 in memory 202 and displayed on the user interface, together with the system proposed light level, determined by processing module 254. FIG. 15c shows User 1's preferred light level 1506 and User 2's preferred light level 1507 along with the system proposed light level 1508. Proposed light level represents the weighted combination of the profiles of users in the same control zone. As illustrative examples, FIGS. 16a-b correspond to the Gaussians shown in FIGS. 13a-b, respectively. That is, the UI on the user device presents the lighting profile information present in the Gaussians in a suitable form for the user of the user device to understand. This allows each user to be informed of his/her neighbours preferences and hence to take these into account. This also allows the "group optimum" light level, as calculated by the processing module 254, to be presented to the user.

Figures 17A, 17B:
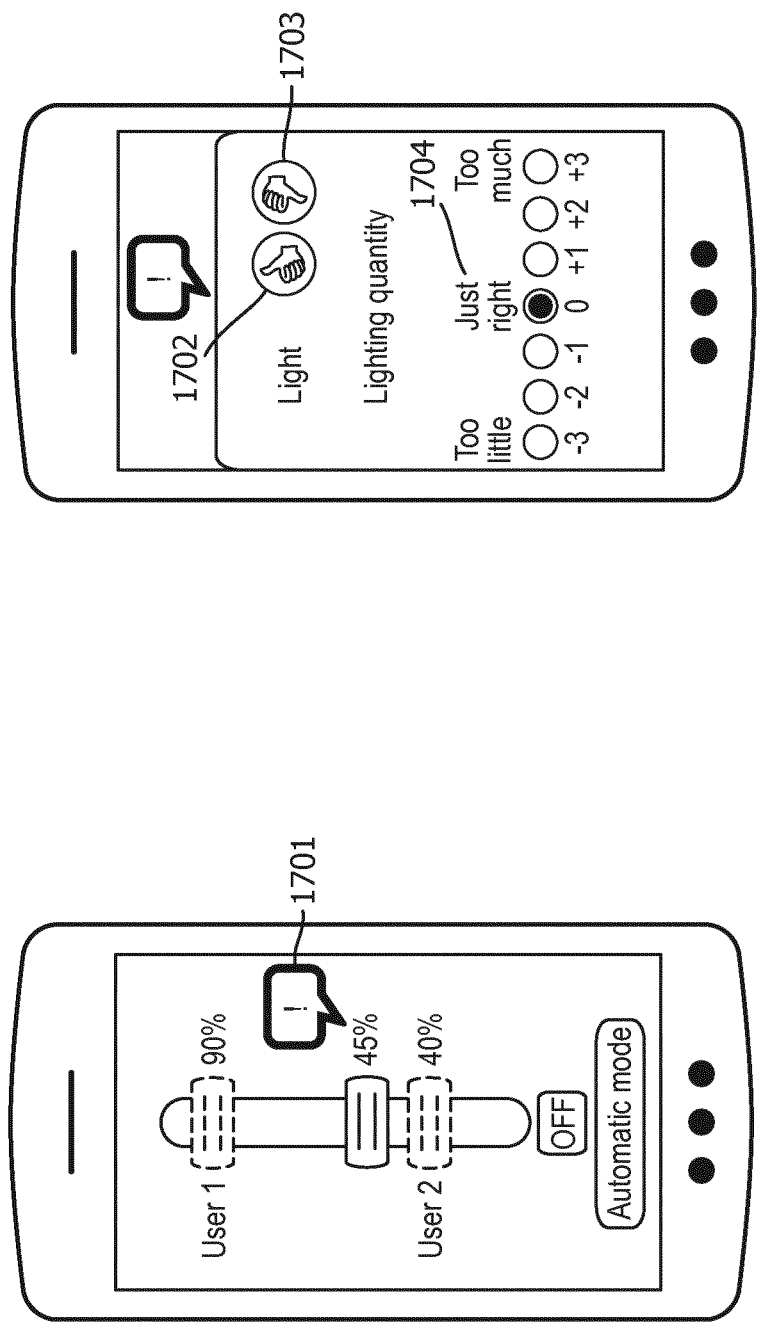
FIGS. 17a-b show example user interfaces for requesting user input.

If a user is classified as inactive, the modelling module 256 requires additional information from him/her in order to obtain user's profile as accurately as possible. In this case the UI controller 260 may control the UI to switch from displaying the other users' preferences, either automatically or upon user input, to playing an input request screen, as shown in FIG. 17b. It is appreciated that the form of the input request screen shown in FIG. 17b is merely exemplary, and that any suitable means may be displayed (e.g. questions, blank text fields, icons etc.) to prompt the user to input the required data. For example, balloon 1701 with an exclamation mark is one way to alert the user that input is required. This balloon 1701 is shown in FIG. 17a next to the user preferences displayed on the UI and by clicking on it, the user can enter the input request screen (e g mini questionnaire window) shown in FIG. 17b. Using the input request screen, the user can express his/her satisfaction with lighting conditions by clicking on 'thumbs up' 1702— meaning that user is satisfied, or 'thumbs down' 1703— meaning that user is dissatisfied. If the user is dissatisfied, this means that he/she is submissive user and he/she will be asked to rate the lighting quantity, e.g. on a 7-point scale 1704. The scale is ranged from "too little" to "too much". The rating input by the user is received by the request module 257 and taken into account and the user's profile 203 is updated by the modelling module 256, without control action actually being performed by the illumination controller 252. This way other submissive users are not forced to confront their neighbours, thus increase the satisfaction of submissive users, since otherwise they would not provide enough feedback for the system to be able to satisfy them as well.

Note that the above user feedback mechanism uses a 7-point scale, but other mechanisms are possible e.g. a thumbs up or down, or a ghost slider of the light controller on which a user may select his preference. More generally, it should be noted that the above-described UI arrangement are exemplary, and other UI arrangements are within the scope of the invention. For example, in the above examples, when operating in the automatic mode, the UI of each user device displays, in addition to that user's preferred lighting level, the individual preferences of the other user(s) and/or the consensus lighting level (denoting a consensus preference, to the extent a consensus can be achieved) thereby indicating to him a difference between his individual preference and the individual and/or collective preferences of the other user(s); when operating in the manual mode the user is not shown the other users' individual or collective preferences—rather only the lighting level which that user has instructed is displayed. However, in alterative implementations, the user may be shown, in the manual mode, the individual and/or collective preferences of other user(s) in the control zone in addition to their instructed level, thereby indicating to him a difference between their instructed level and the other users' individual and/or collective preferences.

Also note that the user profiles in the above embodiments have been described as represented by univariate Gaussian functions for the purposes of illustration. As is known in the art a univariate may be represented fully by a mean and a variance value, which may be all that is stored in the profile. However, the intention is not limited in this respect, and users may be modelled using other models. These may also be represented by a mean and a variance and/or by one or more other parameters. Note that the terms "user model" and "user profile" are used interchangeably herein, and in general refer to any suitable data and/or data structure for representing a user's learned light level preferences.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting system comprising:
   at least one luminaire arranged to illuminate an area shared by a plurality of users;
   a communications interface configured to receive, from at least a first user from the plurality of users, one or more level adjustment instructions each denoting an illumination level for the shared area;
   an illumination controller configured, when operating in a manual control mode for the shared area, to control the at least one luminaire to emit illumination at an illumination level denoted by a most recently received level adjustment instruction from the one or more level adjustment instructions, the illumination controller further configured, when operating in an automatic control mode for the shared area, to control the at least one luminaire to emit illumination at a consensus illumination level;
   a modelling module configured to generate in a memory of the lighting system a plurality of user profiles, one each for a respective one of the plurality of users, each of the plurality of user profiles comprising user information and a tolerance value, the user information of each of the plurality of user profiles comprises a user profile illumination level associated with its respective user, the user profile illumination level for the first user is derived from the one or more level adjustment instructions, the tolerance value of each of the plurality of user profiles denotes a tolerance associated with its respective user to deviations from the user profile illumination level associated with the respective user; and
   a processing module configured to determine the consensus illumination level based on the user profile illumination levels of at least two of the plurality of user profiles stored in the memory, the processing module further configured to determine the tolerance value in each of the plurality of user profiles based on at least two level adjustment instructions received from the respective user associated with the user profile;
   wherein the illumination controller is configured, in response to a mode switch instruction, to switch from the manual control mode to an automatic control mode for the shared area.

2. The lighting system according to claim 1, further comprising a selection module configured to use dominance indicators associated with each of the plurality of users to select the at least two user profiles for use by the processing module in determining the consensus illumination level, wherein each of the plurality of user profiles comprises the dominance indicator for its respective user, the dominance indicator indicating whether or not its respective user is dominant.

3. The lighting system according to claim 2, wherein the modelling module is configured to generate the dominance indicator for each of the plurality of user profiles by comparing historic illumination level data of the at least one luminaire with the user information of its respective user profile.

4. The lighting system according to claim 3, wherein the modelling module is configured to generate the dominance indicator for the first user by determining from the historic illumination level data, a duration for which the at least one luminaire has emitted illumination at a level matching the one or more illumination levels denoted in the one or more level adjustment instructions received from the first user.

5. The lighting system according to claim 1, further comprising a request module configured to identify whether at least a second user from the plurality of users is inactive using an activity indicator in the user profile for the second user, and, when the second user is identified as being inactive, to send a request for a preferred lighting level, via the communications interface, to the second user, wherein the user profile for the second user comprises the activity indicator indicating whether or not the second user is active, and wherein the modelling module is configured to determine the activity indicator for the second user by determining an extent to which the second user has provided any level adjustment instructions received by the communications interface.

6. The lighting system according to claim 5, wherein if the second user responds, via the communications interface, to the request by indicating in a response that the second user is not satisfied with the illumination emitted by the at least one luminaire, the modelling module is configured to update the user profile for the second user with preference information derived from the response, the processing module configured to use the preference information to determine the consensus illumination level in that event.

7. The lighting system according to claim 1, wherein the processing module is configured to determine, for at least a second user from the plurality of users, a reduced illumination level that is lower than the user profile illumination level stored in the user profile for the second user by an amount determined by the tolerance value stored in the user profile for the second user, and to determine the consensus illumination level based on the reduced illumination level.

8. The lighting system according to claim 7, further comprising a request module configured to output to the second user, via the communications interface, a level reduction request, wherein the reduced illumination level for the second user is only used to determine the consensus illumination level if the second user approves the level reduction request.

9. The lighting system according to claim 1, wherein the mode switch instruction is instigated automatically:
  according to an electronically stored lighting schedule, and/or
  based on sensor signals received from at least one occupancy sensor arranged to provide sensor coverage of the shared area, and/or
  if no level adjustment instruction is received within a predetermined interval of time.

10. The lighting system according to claim 1, wherein the mode switch instruction is instigated manually by a user.

11. The lighting system according to claim 1, wherein the processing module is configured to determine the consensus illumination level by combining the user profile illumination levels of the at least two of the plurality of user profiles.

12. The lighting system according to claim 11, wherein the processing module is configured, in combining the user profile illumination levels of the at least two of the plurality of user profiles, to apply an averaging function to the user profile illumination levels of the at least two of the plurality of user profiles.

13. The lighting system according to claim 12, wherein the processing module is configured, in applying the averaging function, to weight the user profile illumination levels of the at least two user profiles according to the tolerance values of the at least two user profiles.

14. The lighting system according to claim 1, wherein the one or more level adjustment instructions are a plurality of level adjustment instructions including at least one level adjustment instruction sent from the first user and at least one level adjustment instruction sent from a second user from the plurality of users and different from the first user.

15. The lighting system according to claim 14, wherein the most recently received level adjustment instruction is the later received of the at least one level adjustment instruction sent from the first user and the at least one level adjustment instruction sent from the second user.

16. A computer implemented method of operating a lighting system comprising at least one luminaire arranged to illuminate an area shared by a plurality of users, the method comprising implementing by a computer system of the lighting system the following steps:
  receiving, from at least a first user from the plurality of users, one or more level adjustment instructions each denoting an illumination level for the shared area;
  operating in a manual control mode for the shared area, by controlling the at least one luminaire to emit illumination at an illumination level denoted by a most recently received level adjustment instruction from the one or more level adjustment instructions;
  generating in a memory of the lighting system a plurality of user profiles, one each for a respective one of the plurality of users, each of the plurality of user profiles comprising user information and a tolerance value, the user information of each of the plurality of user profiles comprises a user profile illumination level associated with its respective user, the user profile illumination level for the first user is derived from the one or more level adjustment instructions, the tolerance value of each of the plurality of user profiles denotes a tolerance to deviations from the user profile illumination level associated with the respective user;
  determining a consensus illumination level based on the user profile illumination levels of at least two of the plurality of user profiles stored in the memory;
  in response to a mode switch instruction, switching from operating in the manual control mode to operating in an automatic control mode for the shared area by controlling the at least one luminaire to emit illumination at the consensus illumination level; and
  determining the tolerance value in each of the plurality of user profiles based on at least two level adjustment instructions received from the respective user associated with the user profile.

17. A computer program product comprising code stored on a computer readable storage medium and configured when run on a computer to implement the method of claim 16.

18. The method according to claim 16, wherein determining the consensus illumination level comprises combining the user profile illumination levels of the at least two of the plurality of user profiles.

19. The method according to claim 18, wherein combining the user profile illumination levels of the at least two of the plurality of user profiles comprises applying an averaging function to the user profile illumination levels of the at least two of the plurality of user profiles.

20. The method according to claim 19, wherein applying the averaging function comprises weighing the user profile illumination levels of the at least two user profiles according to the tolerance values of the at least two user profiles.

* * * * *